(12) United States Patent
Watanabe

(10) Patent No.: US 8,404,211 B2
(45) Date of Patent: Mar. 26, 2013

(54) METHOD FOR PRODUCING LITHIUM-CONTAINING COMPOSITE OXIDE AND NON-AQUEOUS SECONDARY BATTERY

(75) Inventor: Kozo Watanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 542 days.

(21) Appl. No.: 12/620,153

(22) Filed: Nov. 17, 2009

(65) Prior Publication Data

US 2010/0136412 A1 Jun. 3, 2010

(30) Foreign Application Priority Data

Nov. 28, 2008 (JP) ................................ 2008-305323

(51) Int. Cl.
*C01G 53/04* (2006.01)
*C01G 51/04* (2006.01)
*C01G 45/12* (2006.01)
*H01M 4/505* (2010.01)
*H01M 4/525* (2010.01)

(52) U.S. Cl. .................. 423/594.4; 423/594.6; 423/599; 429/231.3

(58) Field of Classification Search .................. 429/223, 429/224, 231.3, 599; 423/594.4, 594.6
See application file for complete search history.

(56) References Cited

U.S. PATENT DOCUMENTS

| 6,051,339 | A * | 4/2000 | Shackle et al. ............ 429/224 X |
| 7,381,395 | B2 * | 6/2008 | Miyazaki et al. .......... 423/594.6 |
| 7,686,984 | B2 * | 3/2010 | Bruce et al. ............... 423/599 X |
| 2007/0218360 | A1 * | 9/2007 | Tabuchi et al. ............... 429/224 |

FOREIGN PATENT DOCUMENTS

| JP | 03-064860 A | 3/1991 |
| JP | 04-006747 A | 1/1992 |
| JP | 06-318458 A | 11/1994 |
| JP | 06-342657 | 12/1994 |
| JP | 08-031406 A | 2/1996 |
| JP | 10-188979 A | 7/1998 |
| JP | 10-270025 | 10/1998 |
| JP | 2001-332261 | 11/2001 |
| JP | 2002-203549 A | 7/2002 |
| JP | 2003-017054 | 1/2003 |
| WO | WO-2005/040039 A1 | 5/2005 |

OTHER PUBLICATIONS

Japanese Office Action issued in Japanese Patent Application No. 2008-305323 mailed Oct. 25, 2012.

* cited by examiner

*Primary Examiner* — Stephen J. Kalafut
(74) *Attorney, Agent, or Firm* — McDermott Will & Emery LLP

(57) ABSTRACT

A method for producing a lithium-containing composite oxide represented by General Formula (1):

$$Li_xM_yMe_{1-y}O_{2+\delta} \qquad (1)$$

where M represents at least one element selected from the group consisting of Ni, Co and Mn, Me represents a metal element that is different from M, $0.95 \leq x \leq 1.10$ and $0.1 \leq y \leq 1$. A lithium compound and a compound that contains M and Me are baked. The thus-obtained baked product is washed with a washing solution that contains one or more water-soluble polar aprotic solvents such as N-methyl-2-pyrrolidone (NMP), N,N'-dimethylimidazolidinone (DMI) and dimethylsulfoxide (DMSO).

11 Claims, 1 Drawing Sheet

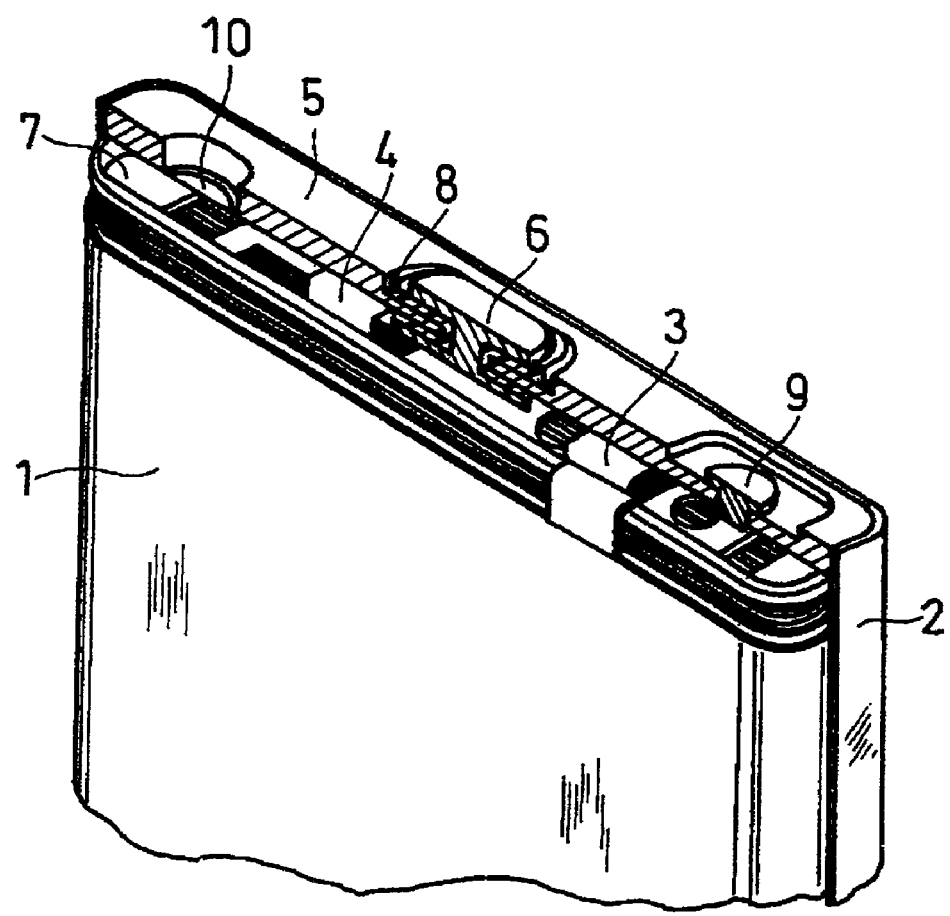

METHOD FOR PRODUCING LITHIUM-CONTAINING COMPOSITE OXIDE AND NON-AQUEOUS SECONDARY BATTERY

FIELD OF THE INVENTION

The present invention relates primarily to a method for producing a lithium-containing composite oxide for use as a positive electrode active material for a non-aqueous secondary battery.

Lithium ion batteries, which are a typical representation of non-aqueous secondary batteries, have features such as a light weight, high electromotive force and high energy density. Accordingly, demand for lithium ion batteries as a power source for driving various mobile communication devices, such as cell phones, and various portable electronic devices, such as digital still cameras, camcorders and notebook personal computers, is expanding.

A lithium ion battery includes a positive electrode that contains a lithium-containing composite oxide serving as a positive electrode active material, a negative electrode that contains a negative electrode active material that capable of absorbing and desorbing lithium, a separator that separates the positive electrode and the negative electrode from each other, and an electrolyte. Examples of lithium-containing composite oxides include $LiNiO_2$, $LiCoO_2$ and so on. Among them, a lithium-nickel-based composite oxide such as $LiNiO_2$ is suitable as a positive electrode active material for a non-aqueous secondary battery because it has a large theoretical capacity and superior high temperature storage characteristics.

However, the lithium-containing composite oxide produces by-products such as lithium hydroxide and lithium carbonate during the synthesis thereof through baking. Such by-products, when included in the battery, react with the electrolyte or the like, causing the deterioration of battery characteristics. The inclusion of such by-products inside the battery also causes a reaction between the lithium hydroxide and the electrolyte in a high temperature environment as well as oxidative decomposition of the lithium carbonate. As a result, a gas is generated, which expands the battery and deforms the electrode in response to the expansion of the battery, thereby causing the deterioration of battery characteristics.

Japanese Laid-Open Patent Publications Nos. 2003-17054, H6-342657 and H10-270025 disclose techniques in which a baked lithium-containing composite oxide is washed with water and dried so as to remove lithium hydroxide and lithium carbonate. Also, Japanese Laid-Open Patent Publication No. 2001-332261 discloses water, a polar organic solvent and an inorganic acid as a treatment solution for washing a lithium-containing composite oxide. As the polar organic solvent, an alcohol having 6 or less carbon atoms, a ketone such as acetone, and an organic acid are disclosed.

BACKGROUND OF THE INVENTION

However, with the method disclosed in Japanese Laid-Open Patent Publications Nos. 2003-17054, H6-342657 and H10-270025 in which a baked lithium-containing composite oxide is washed with water, an exchange reaction between $Li^+$ ions and $H^+$ ions is likely to occur between the lithium-containing composite oxide and water. Such an exchange reaction can also occur between water that remains before a dehydration process performed after water-washing and the lithium-containing composite oxide. $Li^+$ ions leached into water cause lithium hydroxide to be newly deposited. Furthermore, such lithium hydroxide reacts with a small amount of carbon dioxide present in the air to generate lithium carbonate. That is, lithium hydroxide and lithium carbonate are regenerated when a lithium-containing composite oxide is washed with water, and there is a limit to the removal of such by-products.

A ketone, such as acetone, as disclosed in Japanese Laid-Open Patent Publication No. 2001-332261 can suppress the exchange reaction between $Li^+$ ions and $H^+$ ions because it does not have an active methylene group. However, such a ketone as a solvent does not easily dissolve lithium hydroxide and lithium carbonate, so there is a limit to its washing effect when used singly to wash a lithium-containing composite oxide.

In view of the above problems, it is an object of the present invention to provide a method for producing a lithium-containing composite oxide wherein the inclusion of lithium hydroxide and lithium carbonate is suppressed to a high degree, and a non-aqueous secondary battery wherein the inclusion of lithium hydroxide and lithium carbonate is suppressed, and battery characteristics and reliability are improved.

BRIEF SUMMARY OF THE INVENTION

A first aspect of the present invention provides a method for producing a lithium-containing composite oxide represented by General Formula (1):

where M represents at least one element selected from the group consisting of Ni, Co and Mn, Me represents a metal element that is different from M, δ represents a deficit or excess of oxygen, $0.95 \leq x \leq 1.10$ and $0.1 \leq y \leq 1$, the method including the steps of:

baking a lithium compound and a compound that contains M and Me to obtain a baked product; and washing the baked product with a washing solution that contains one or more water-soluble polar aprotic solvents selected from the group consisting of water-soluble polar aprotic solvents represented by the following General Formulas (2) to (8):

-continued

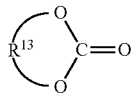
(7)

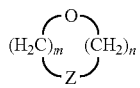
(8)

where $R^1$ and $R^2$ each independently represent a hydrogen atom or an alkyl group having 1 to 3 carbon atoms, or $R^1$ and $R^2$ are bonded to each other and represent an alkylene group having 3 to 6 carbon atoms that forms a ring with a nitrogen atom; $R^3$ represents an alkyl group having 1 to 3 carbon atoms or a cycloalkyl group having 4 to 7 carbon atoms; $R^4$ and $R^5$ each independently represent a methyl group or an ethyl group; $R^6$ and $R^7$ each independently represent a methyl group or an ethyl group, or $R^6$ and $R^7$ are bonded to each other and represent an alkylene group having 2 to 4 carbon atoms that forms a ring with two nitrogen atoms and a carbonyl carbon; $R^8$ and $R^9$ each independently represent a methyl group or an ethyl group, or $R^8$ and $R^9$ are bonded to each other and represent an alkylene group having 4 to 6 carbon atoms that forms a ring with a sulfur element; $R^{10}$ and $R^{11}$ each independently represent a hydrogen atom, a methyl group or an ethyl group; $R^{12}$ represents an alkyl group having 1 to 3 carbon atoms; $R^{13}$ represents an alkylene group having 2 to 4 carbon atoms; Z represents an oxygen atom or a methylene group, and m and n each independently represent an integer from 1 to 3.

According to this method, when a baked product (that is, a lithium-containing composite oxide (1)) obtained by baking a lithium compound and a compound that contains elements represented by M and Me is washed with a washing solution that contains a water-soluble polar aprotic solvent represented by one of General Formulas (2) to (8), it is possible to suppress the leaching of Li$^+$ ions from the lithium-containing composite oxide (1) and the regeneration of lithium hydroxide and lithium carbonate in response to such leaching, as a result of which, it is possible to suppress the inclusion of lithium hydroxide and lithium carbonate in the lithium-containing composite oxide to a high degree.

A second aspect of the present invention provides a method for producing a lithium-containing composite oxide represented by General Formula (1):

$$Li_xM_yMe_{1-y}O_{2+\delta}$$ (1)

where M represents at least one element selected from the group consisting of Ni, Co and Mn, Me represents a metal element that is different from M, δ represents a deficit or excess of oxygen, 0.95≦x≦1.10 and 0.1≦y≦1, the method including the steps of:

baking a lithium compound and a compound that contains M and Me to obtain a baked product; and washing the baked product with a washing solution that contains a water-soluble polar aprotic solvent, wherein when the washing step includes a plurality of washing steps, where a number of repetitions of the washing step is defined as n, where n is an integer equal to or greater than 2, the washing step includes:

a first washing step of washing the baked product obtained in the baking step with a first washing solution that includes a solvent mixture of water and a water-soluble polar aprotic solvent; and an nth washing step of washing the baked product that has been washed in an (n−1)th washing step with an nth washing solution that includes a solvent mixture of water and a water-soluble polar aprotic solvent or that includes only a water-soluble polar aprotic solvent, and the water-soluble polar aprotic solvent content of the nth washing solution is higher than the water-soluble polar aprotic solvent content of an (n−1)th washing solution.

In this case, it is possible to efficiently remove the lithium hydroxide and lithium carbonate included in the lithium-containing composite oxide while suppressing the leaching of Li$^+$ ions from the lithium-containing composite oxide, which is a baked product, and the regeneration of lithium hydroxide and lithium carbonate in response to such leaching.

Another aspect of the present invention provides a non-aqueous secondary battery that includes a positive electrode that contains a positive electrode active material, a negative electrode that contains a negative electrode active material, a separator that is interposed between the positive electrode and the negative electrode, and a non-aqueous electrolyte, wherein the positive electrode active material contains a lithium-containing composite oxide produced by either of the method for producing a lithium-containing composite oxide according to the first aspect of the present invention or the method for producing a lithium-containing composite oxide according to the second aspect of the present invention.

Because the above non-aqueous secondary battery employs a lithium-containing composite oxide produced by the production method described above as a positive electrode active material, it is possible to suppress the inclusion of lithium hydroxide and lithium carbonate inside the battery to a high degree. Thus, the above non-aqueous secondary battery has improved battery characteristics and reliability.

According to the present invention, it is possible to suppress the inclusion of lithium hydroxide and lithium carbonate in the lithium-containing composite oxide to a high degree. In addition, with the use of the lithium-containing composite oxide as a positive electrode active material, it is possible to suppress electrolyte decomposition and the generation of gas, as a result of which, it is possible to provide a non-aqueous secondary battery with superior storage characteristics and charge/discharge cycle characteristics.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWING

FIG. 1 is a partially cutaway perspective view of a non-aqueous secondary battery according to an embodiment of the present invention.

DETAILED DESCRIPTION OF THE INVENTION

A production method of a lithium-containing composite oxide according to an embodiment of the present invention is a production method of a lithium-containing composite oxide represented by General Formula (1):

$$Li_xM_yMe_{1-y}O_{2+\delta}$$ (1)

where M, Me, x, y and δ are the same as above.

It is preferable that the lithium-containing composite oxide (1) is a lithium-nickel-based composite oxide that contains nickel as an element represented by M. In a lithium-nickelbased composite oxide, an exchange reaction between Li⁺ ions and H⁺ ions occurs particularly easily when washed with water. Since such a lithium-nickel-based composite oxide easily produces lithium hydroxide and lithium carbonate, the application of the method for producing a lithium-containing composite oxide of the present embodiment is very effective.

Examples of the metal element represented by Me (except for Ni, Co and Mn) include elements that belong to Group I to Group XIV in the periodic table (IUPAC, 1989) except for Ni, Co and Mn. Among them, Al, Cr, Fe, Mg and Zn are preferable, and Mg and Al are particularly preferable.

There is no particular limitation on the deficit or excess of oxygen represented by δ, but it is usually ±5% of a stoichiometric composition, and preferably ±1%.

A specific example of a lithium-containing composite oxide (1) that contains Ni, Co and Al as M and Me includes a lithium-nickel-based composite oxide represented by Formula (1-1).

$$LiNi_{0.8}Co_{0.15}Al_{0.05}O_2 \qquad (1\text{-}1)$$

Specific examples of a lithium-containing composite oxide (1) that contains Ni, Co and Mn as M and Me include lithium-nickel-based composite oxides represented by Formulas (1-2) and (1-3).

$$LiNi_{0.5}Co_{0.2}Mn_{0.3}O_2 \qquad (1\text{-}2)$$

$$LiNi_{1/3}Co_{1/3}Mn_{1/3}O_2 \qquad (1\text{-}3)$$

The lithium-containing composite oxide (1) is not limited to such lithium-nickel-based composite oxides. Other specific examples include lithium-containing composite oxides represented by Formulas (1-4) to (1-6), and so on.

$$LiMn_2O_4 \qquad (1\text{-}4)$$

$$LiCoO_2 \qquad (1\text{-}5)$$

$$LiCo_{0.98}Mg_{0.02}O_2 \qquad (1\text{-}6)$$

According to a method for producing a lithium-containing composite oxide (1), first, a compound that contains elements represented by M and Me and a lithium compound are baked in a baking step.

Examples of the lithium compound include lithium hydroxide, lithium carbonate, lithium nitrate, lithium peroxide, and so on. Lithium hydroxide or lithium carbonate is suitable for the production of a lithium-nickel-based composite oxide.

The compound that contains M and Me can be a hydroxide, oxide, carbonate, oxalate or the like that contains one or more elements such as Ni, Co, Mn, Al, Cr, Fe, Mg and Zn. A compound that contains two or more kinds of M and Me can be obtained by, for example, a method (precipitation method) in which two or more sulfates containing M and Me are blended, such that M and Me are different from each other, to prepare a saturated aqueous solution, the saturated aqueous solution is neutralized, and a hydroxide containing two or more kinds of M and Me is precipitated. The thus-obtained hydroxide is heated in the air or in an oxygen atmosphere to oxidize the hydroxide, whereby an oxide containing two or more kinds of M and Me can be obtained.

The compound that contains Ni, Co and Al and is represented by Formula (1-1) can be a hydroxide obtained by neutralizing a saturated aqueous solution that contains nickel sulfate, cobalt sulfate and aluminum sulfate to precipitate, or an oxide obtained by heating the hydroxide in the air or in an oxygen atmosphere to oxidize the hydroxide. The compound that contains Ni, Co and Mn and is represented by Formula (1-2) or (1-3) can be a hydroxide obtained by neutralizing a saturated aqueous solution that contains nickel sulfate, cobalt sulfate and manganese sulfate to precipitate (precipitation method), or an oxide obtained by heating the hydroxide in the air or in an oxygen atmosphere to oxidize the hydroxide.

There is no particular limitation on the conditions for baking a lithium compound and a compound that contains M and Me, and any known baking conditions can be employed. The baking of a lithium compound and a compound that contains M and Me may be multi-stage baking. The baking temperature is set to, for example, approximately 650 to 900° C.

The atmosphere for baking can be an air atmosphere, an oxygen atmosphere or the like. Particularly when synthesizing a lithium-nickel-based composite oxide that has a high nickel content, it is preferable to increase the oxygen partial pressure in the baking atmosphere. Also, when synthesizing a lithium-nickel-based composite oxide that has a high nickel content, it is preferable that the baking atmosphere does not substantially contain carbon dioxide. The baking atmosphere preferably has a dew point of −20° C. or less.

In the method for producing a lithium-containing composite oxide of the present embodiment, a lithium-containing composite oxide obtained in the above baking step is washed in the following washing step (I) (a first method for producing a lithium-containing composite oxide) or by repeating the following washing step (II) a plurality of times (a second method for producing a lithium-containing composite oxide).

(I) The lithium-containing composite oxide is washed with a washing solution that contains one or more water-soluble polar aprotic solvents selected from the group consisting of N-substituted amides (2), N-substituted ureas (3), sulfoxides (4), sulfolanes (5), nitriles (6), carbonic acid esters (7) and cyclic ethers (8).

(II) The lithium-containing composite oxide is washed with a washing solution that contains a water-soluble polar aprotic solvent. In the washing step (II) shown here, the number of repetitions of the washing step is n (n is an integer equal to or greater than 2, the same applies hereinafter). In a first washing step, the lithium-containing composite oxide is washed using a first washing solution composed of a solvent mixture of water and a water-soluble polar aprotic solvent. Then, in an nth washing step, the baked product that has been washed in an (n−1)th washing step is washed using a washing solution (nth washing solution) that is composed of a solvent mixture of water and a water-soluble polar aprotic solvent or composed only of a water-soluble polar aprotic solvent and that has a higher water-soluble polar aprotic solvent content than that of the (n−1)th washing solution.

Hereinafter, a washing step of the first method for producing a lithium-containing composite oxide will be described. The washing step of the first method for producing a lithium-containing composite oxide employs a washing solution that contains one or more water-soluble polar aprotic solvents represented by General Formulas (2) to (8).

$R^1$ and $R^2$ of the N-substituted amide (2) each independently represent a hydrogen atom or an alkyl group having 1 to 3 carbon atoms, or $R^1$ and $R^2$ are bonded to each other and represent an alkylene group having 3 to 6 carbon atoms that forms a ring with a nitrogen atom. When $R^1$ and $R^2$ are bonded to each other, the N-substituted amide (2) is an N-substituted cyclic amide. Examples of the alkyl group having 1 to 3 carbon atoms include methyl, ethyl, n-propyl and isopropyl. Examples of the alkylene group having 3 to 6 carbon atoms include trimethylene, propylene, triethylene, butylene, tetramethylene, pentamethylene, hexamethylene, and so on. $R^1$ and $R^2$ preferably represent a hydrogen atom, a methyl group or an ethyl group when they are independent of each other, and $R^1$ and $R^2$ are preferably trimethylene when they are bonded to each other.

$R^3$ of the N-substituted amide (2) represents an alkyl group having 1 to 3 carbon atoms or a cycloalkyl group having 4 to 7 carbon atoms. Examples of the alkyl group having 1 to 3 carbon atoms include those listed for $R^1$ and $R^2$ and, among them, a methyl is preferable. Examples of the cycloalkyl group having 4 to 7 carbon atoms include cyclopentyl, cyclohexyl, and so on. Among them, a cyclohexyl is preferable.

Specific examples of the N-substituted amide (2) include N-methyl formamide, N-methyl acetamide, N-methyl propionamide, N,N-dimethyl formamide, N,N-diethyl formamide, N,N-dimethyl acetamide, N-methyl-2-pyrrolidone, N-cyclohexyl pyrrolidone, N-methyl caprolactam, and so on.

In the N-substituted urea (3), $R^4$ and $R^5$ each independently represent a methyl group or an ethyl group, and preferably a methyl. $R^6$ and $R^7$ each independently represent a methyl group or an ethyl group, or $R^6$ and $R^7$ are bonded to each other and represent an alkylene group having 2 to 4 carbon atoms that forms a ring with two nitrogen atoms and a carbonyl carbon, and the latter alkylene group having 2 to 4 carbon atoms is particularly preferable. Examples of the alkylene group having 2 to 4 carbon atoms include ethylene, trimethylene, propylene, tetramethylene, and so on. When $R^6$ and $R^7$ are bonded to each other, the N-substituted urea (3) represents an N-substituted cyclic urea. $R^6$ and $R^7$ preferably represent a methyl when they are independent of each other, and $R^6$ and $R^7$ are preferably an ethylene or trimethylene when they are bonded to each other.

Specific examples of the N-substituted urea (3) include N,N,N',N'-tetramethyl urea, N,N'-dimethylimidazolidinone (N,N'-dimethyl ethylene urea), N,N'-dimethyl propylene urea, and so on.

In the sulfoxide (4), $R^8$ and $R^9$ each independently represent a methyl group or an ethyl group, or $R^8$ and $R^9$ are bonded to each other and represent an alkylene group having 4 to 6 carbon atoms that forms a ring with a sulfur element, and it is particularly preferable that $R^8$ and $R^9$ each independently represent a methyl group or an ethyl group. Examples of the alkylene group having 4 to 6 carbon atoms include tetramethylene, pentamethylene, hexamethylene, and so on. When $R^8$ and $R^9$ are bonded to each other, the sulfoxide (4) represents a cyclic sulfoxide. $R^8$ and $R^9$ preferably represent a methyl when they are independent of each other, and $R^8$ and $R^9$ preferably represent a tetramethylene when they are bonded to each other.

Specific examples of the sulfoxide (4) include dimethylsulfoxide, tetramethylene sulfoxide, and so on.

$R^{10}$ and $R^{11}$ of the sulfolane (5) each independently represent a hydrogen atom, a methyl group or an ethyl group. Among them, it is particularly preferable that $R^{10}$ and $R^{11}$ each represent a hydrogen atom. Specific examples of the sulfolane (5) include sulfolane (tetramethylene sulfone), dimethylsulfolane, and so on.

$R^{12}$ of the nitrile (6) represents an alkyl group having 1 to 3 carbon atoms. Examples of the alkyl group having 1 to 3 carbon atoms include those listed for $R^1$ and $R^2$ and, among them, a methyl is preferable. Specific examples of the nitrile (6) include acetonitrile, propiononitrile, and so on.

$R^{13}$ of the carbonic acid ester (7) represents an alkylene group having 2 to 4 carbon atoms. Examples of the alkylene group having 2 to 4 carbon atoms include those listed for $R^6$ and $R^7$ and, among them, a propylene group ($-CH_2(CH_3)CH_2-$) is preferable. Specific examples of the carbonic acid ester (7) include propylene carbonate, ethylene carbonate, and so on.

In the cyclic ether (8), m and n each independently represent an integer from 1 to 3. Z represents an oxygen atom or methylene, and it is particularly preferable that Z represents an oxygen atom. When Z is an oxygen atom, the cyclic ether (8) represents a cyclic diether. When Z is methylene, the cyclic ether (8) represents a cyclic monoether. Specific examples of the cyclic ether (8) include dioxane (1,4-, 1,2- or 1,3-dioxane), and so on.

In the first method for producing a lithium-containing composite oxide, it is preferable that the washing solution is composed only of one or more water-soluble polar aprotic solvents represented by General Formulas (2) to (8), or composed of a solvent mixture of water and a water-soluble polar aprotic solvent described above.

It is preferable that the water-soluble polar aprotic solvent contained in the washing solution is N-methyl-2-pyrrolidone, N-methyl formamide, N-methyl acetamide, N-methyl propionamide, N,N-dimethyl formamide, N-cyclohexyl pyrrolidone, N,N'-dimethylimidazolidinone, N,N'-dimethyl propylene urea, dimethyl sulfoxide, sulfolane, acetonitrile, propylene carbonate or dioxane.

In the first method for producing a lithium-containing composite oxide, the lithium-containing composite oxide subjected to the washing step preferably has an average particle size of, but is not particularly limited to, 1 to 30 μm, and more preferably 10 to 30 μm.

The average particle size of the lithium-containing composite oxide can be measured by a wet-type laser particle size distribution analyzer available from Microtrack Inc., or the like. In this case, a particle size at 50% accumulation in a particle size distribution based on volume (median value: $D_{50}$) can be regarded as the average particle size.

In the first method for producing a lithium-containing composite oxide, the washing step is performed after a lithium-containing composite oxide obtained in the baking step has been pulverized so as to have an average particle size within the above range.

The washing step is carried out:

(a) once using a washing solution composed only of one or more water-soluble polar aprotic solvents represented by General Formulas (2) to (8);

(b) once using a washing solution composed of a solvent mixture of water and one or more water-soluble polar aprotic solvents represented by General Formulas (2) to (8); or (c) twice or more using different washing solutions selected from a washing solution composed of a solvent mixture of water and one or more water-soluble polar aprotic solvents represented by General Formulas (2) to (8) and a washing solution composed only of one or more water-soluble polar aprotic solvents represented by General Formulas (2) to (8), in each washing step.

It is preferable that the first method for producing a lithium-containing composite oxide further includes a water-washing step of washing the baked product with water before the washing step. In this case, the process of removing lithium hydroxide and lithium carbonate from the lithium-containing composite oxide which is a baked product can be performed more efficiently.

The method for washing a lithium-containing composite oxide in the washing step and the water-washing step may be either an operation (flow-type operation, continuous operation) in which a washing solution is allowed to flow through a pulverized lithium-containing composite oxide, or an operation (batch-type operation, lot operation) in which a pulverized lithium-containing composite oxide is housed in a container and a washing solution is introduced and stirred.

When the washing step and the water-washing step are performed by the flow-type operation, a lithium-containing composite oxide is placed on filter paper, and a washing solution is poured onto the lithium-containing composite oxide from above.

When the washing step and the water-washing step are performed by the batch-type operation, it is only necessary to stir the lithium-containing composite oxide such that it does not precipitate in the washing solution. For this reason, a wet-type mixing mill, dispersion mill or the like can be used as a container for stirring a lithium-containing composite oxide.

In this case, the time for which the lithium-containing composite oxide and the washing solution are stirred may be from approximately several minutes to several hours, and preferably, 5 minutes to 12 hours.

In the washing step and the water-washing step, there is no particular limitation on the temperature of the washing solution, and it can be set as appropriate within a range equal to or less than the boiling point of the washing solution.

In the case of (b), the ratio of one or more water-soluble polar aprotic solvents represented by General Formulas (2) to (8) to the total amount of the washing solution is set as appropriate according to the combination of solvents, but the ratio is preferably 50 to 99.9 wt %.

In the case of (c), it is preferable to use a washing solution (first washing solution) composed of a solvent mixture of water and a water-soluble polar aprotic solvent described above in the first washing step, and use a washing solution (nth washing solution) composed of a solvent mixture of water and a water-soluble polar aprotic solvent described above or composed only of a water-soluble polar aprotic solvent described above in the second or subsequent (nth) step.

Furthermore, in the second or subsequent washing step (nth washing step), it is preferable that the water-soluble polar aprotic solvent content of the nth washing solution is set higher than that of the (n−1)th washing solution used in the previous washing step ((n−1)th washing step).

In this manner, the water content of the washing solution is set high in an initial stage in which the number of repetition of washing step is small, and the water-soluble polar aprotic solvent content of the washing solution is set higher as the number of repetitions of the washing step increases, whereby, in the initial stage of the washing process, the speed at which lithium hydroxide and lithium carbonate dissolve into the washing solution can be increased, achieving a reduction in the required amount of washing solution and a reduction in the washing time. That is, the efficiency of removing by-products, namely, lithium hydroxide and lithium carbonate, produced in the baking step can be improved. Moreover, it is possible to reduce the amount of water that remains in the lithium-containing composite oxide while maintaining a certain washing effect as the number of repetitions of the washing step increases, as a result of which, the regeneration of by-products can be suppressed even more reliably.

In the case of performing the washing step twice or more, the water-soluble polar aprotic solvent content of the total of the first washing solution is set as appropriate according to the combination of solvents used, but the water-soluble polar aprotic solvent content is preferably 20 wt % or more, and more preferably 20 to 95 wt %.

Also, the water-soluble polar aprotic solvent content of the total amount of the washing solution (nth washing solution) used in the final washing step is set as appropriate according to the combination of solvents used, but the water-soluble polar aprotic solvent content is preferably 80 wt % or more, and more preferably 95 wt % or more.

The water-soluble polar aprotic solvent content of a washing solution can be set as appropriate by comparing and considering the dissolution speed of lithium hydroxide and lithium carbonate into the washing solution (the efficiency of removing such by-products) and the amount of by-products regenerated in the washing step, or by considering the amount of water that remains in the baked product (lithium-containing composite oxide) after the washing step.

In the first method for producing a lithium-containing composite oxide, it is preferable that the compound that contains M and Me is a compound containing nickel. In this case, it is possible to produce a lithium-nickel-based composite oxide that has a large theoretical capacity as a positive electrode active material and has superior high temperature storage characteristics.

Furthermore, in the above case,
(i) it is preferable that the compound containing nickel is an oxide or hydroxide containing nickel, and
(ii) it is preferable that the lithium compound is lithium hydroxide or lithium carbonate.

Both (i) and (ii) are particularly preferable when producing a lithium-nickel-based composite oxide.

In the first method for producing a lithium-containing composite oxide, when the washing step is repeated a plurality of times, it is preferable that the washing step, where the number of repetitions of the washing step is defined as n, includes:
a first washing step of washing a baked product obtained in the baking step with a first washing solution composed of a solvent mixture of water and a water-soluble polar aprotic solvent selected from the above-described group; and
an nth washing step of washing the baked product that has been washed in an (n−1)th washing step with an nth washing solution composed of a solvent mixture of water and a water-soluble polar aprotic solvent selected from the above-described group or composed only of a water-soluble polar aprotic solvent selected from the above-described group, and that the water-soluble polar aprotic solvent content of the nth washing solution is higher than that of the (n−1)th washing solution.

In this case, it is possible to efficiently remove lithium hydroxide and lithium carbonate included in the lithium-containing composite oxide while suppressing the leaching of $Li^+$ ions from the lithium-containing composite oxide, which is a baked product, as well as the regeneration of lithium hydroxide and lithium carbonate in response to such leaching.

Next, a washing step of the second method for producing a lithium-containing composite oxide will be described.

In the washing step of the second method for producing a lithium-containing composite oxide, a washing solution that contains a water-soluble polar aprotic solvent is used.

Examples of the water-soluble polar aprotic solvent include water-soluble polar aprotic solvents represented by General Formulas (2) to (8), pyridines such as pyridine and picoline (2-, 3- or 4-methylpyridine), phosphoric acid amides such as hexamethylphosphoric triamide, ketones such as acetone and methylethylketone, and so on.

In the second method for producing a lithium-containing composite oxide, there is no particular limitation on the average particle size of the lithium-containing composite oxide subjected to the washing step, and the average particle size can be selected as appropriate within the same range as in the case of the first method for producing a lithium-containing composite oxide.

In the second method for producing a lithium-containing composite oxide, the washing step is performed after a lithium-containing composite oxide obtained in the baking step has been pulverized so as to have an average particle size within the above range.

The second method for producing a lithium-containing composite oxide includes a plurality of washing steps, and the washing steps are performed by using different washing solutions selected from a washing solution composed of a solvent mixture of water and a water-soluble polar aprotic solvent and a washing solution composed only of a water-soluble polar aprotic solvent as washing solutions in the respective washing steps.

Furthermore, it is possible to perform a water-washing step of washing a pulverized product of the lithium-containing composite oxide obtained in the above baking step with water before the first washing step.

The method for washing a lithium-containing composite oxide in the washing step and the water-washing step may be either an operation (flow-type operation, continuous operation) in which a washing solution is allowed to flow through a pulverized lithium-containing composite oxide, or an operation (batch-type operation, lot operation) in which a pulverized lithium-containing composite oxide is housed in a container and a washing solution is introduced and stirred.

A specific operation method and stirring time can be set in the same manner as the operation method and stirring time described in the first method for producing a lithium-containing composite oxide.

In addition, the water-soluble polar aprotic solvent content of the total amount of the washing solution is set as appropriate according to the combination of solvents used, but the water-soluble polar aprotic solvent content is preferably 50 to 99.9 wt %.

It is preferable to use a washing solution (first washing solution) composed of a solvent mixture of water and a water-soluble polar aprotic solvent in the first washing step and use a washing solution (nth washing solution) composed of a solvent mixture of water and a water-soluble polar aprotic solvent or composed only of a water-soluble polar aprotic solvent in the second or subsequent (nth) washing step.

Furthermore, in the second or subsequent washing step (nth washing step), it is preferable that the water-soluble polar aprotic solvent content of the nth washing solution is set higher than the water-soluble polar aprotic solvent content of the (n−1)th washing solution used in the previous washing step ((n−1)th washing step).

The effect obtained when the water content of the washing solution is set high in an initial stage in which the number of repetitions of the washing step is small, and the water-soluble polar aprotic solvent content of the washing solution is set higher as the number of repetitions of the washing step increases as described above is the same as that in the case of the first method for producing a lithium-containing composite oxide.

The water-soluble polar aprotic solvent content of the total amount of the first washing solution is set as appropriate according to the combination of the solvents used, but the water-soluble polar aprotic solvent content is preferably 20 wt % or more, and more preferably 20 to 95 wt %.

Also, the water-soluble polar aprotic solvent content of the total amount of the washing solution (nth washing solution) used in the final washing step is set as appropriate according to the combination of solvents used, but the water-soluble polar aprotic solvent content is preferably 80 wt % or more, and more preferably 95 wt % or more.

The water-soluble polar aprotic solvent content of a washing solution can be set as appropriate by comparing and considering the dissolution speed of lithium hydroxide and lithium carbonate into the washing solution (the efficiency of removing such by-products) and the amount of by-products regenerated in the washing step, or by considering the amount of water that remains in the baked product (lithium-containing composite oxide) after the washing step.

In either of the first method for producing a lithium-containing composite oxide and the second method for producing a lithium-containing composite oxide, the washing solution is removed from the baked product (lithium-containing composite oxide) by means of filtration, filter pressing, decantation or the like after completion of the washing step and the water-washing step. After that, a drying process such as heat drying or drying under a reduced pressure is performed where necessary. In this manner, the washing solution is separated from the lithium-containing composite oxide.

Adjustment is made such that, in the lithium-containing composite oxide from which the washing solution has been removed and that has been subjected to a drying process where necessary, the remaining amount of washing solution becomes preferably 600 ppm or less, and more preferably 300 ppm or less, whereby it is possible to suppress the occurrence of $Li^+$ ion leaching between the lithium-containing composite oxide and residual water in the lithium-containing composite oxide.

The amount of washing solution remaining in the lithium-containing composite oxide can be calculated by extracting the washing solution with the use of an extraction liquid that has a high affinity for the washing solution and is capable of separating the washing solution and the lithium-containing composite oxide, and measuring the washing solution content of the extraction liquid by gas chromatography, liquid chromatography or the like. The extraction liquid can be selected as appropriate from various organic solvents.

In the case where the lithium-containing composite oxide is used as a coating material to produce a positive electrode and the solvent used in the coating material and the solvent used in the washing solution are the same type of solvent, the drying process after a washing step can be omitted.

In the method for producing a lithium-containing composite oxide, a water-soluble polar aprotic solvent is used in the washing step of washing the baked product, so it is possible to efficiently remove the by-products produced during baking, namely, lithium hydroxide and lithium carbonate, to a high degree while suppressing the leaching of $Li^+$ ions into the washing solution by proton exchange.

Thus, the method for producing a lithium-containing composite oxide is suitable as a method for producing a high quality lithium-containing composite oxide.

The lithium-containing composite oxide produced by the above production method is suitable as a positive electrode active material for a non-aqueous secondary battery. In particular, because the by-products such as lithium hydroxide and lithium carbonate have been removed to a high degree, disadvantages such as gas generation during use of the battery and an increase in the internal pressure can be suppressed, and the reliability of the non-aqueous secondary battery can be improved. Moreover, the battery's cycle characteristics can be improved especially in a high temperature region.

A non-aqueous secondary battery of the present embodiment contains a lithium-containing composite oxide produced by the above production method as a positive electrode active material.

FIG. 1 is a partially cutaway perspective view of a non-aqueous secondary battery according to the present embodiment.

Referring to FIG. 1, the non-aqueous secondary battery includes an electrode group 1 formed by spirally winding a positive electrode, a negative electrode and a separator that separates the positive electrode and the negative electrode from each other. The electrode group 1 is housed, together with a non-aqueous electrolyte, in a battery case 2. To one end in a direction perpendicular to the spirally winding direction (longitudinal direction) of the electrode group 1, a positive electrode lead 3 that is connected to the positive electrode and a negative electrode lead 4 that is connected to the negative electrode are provided.

The positive electrode lead 3 is connected to a sealing plate 5 for sealing the battery case 2 on the opening end side of the battery case 2. The sealing plate 5 also serves as a positive electrode-side external connection terminal. Likewise, the negative electrode lead 4 is connected to a negative electrode-side external connection terminal 6 on the opening end side of the battery case 2.

Inside the battery case 2, an insulating plate 7 for separating the electrode group 1 and the sealing plate 5 and separating the positive electrode lead 3 and the negative electrode lead 4 is disposed. The negative electrode-side external connection terminal 6 is disposed inside a through hole that is provided in the sealing plate 5 that serves as a positive electrode-side external connection terminal, and the sealing plate 5 and the negative electrode-side external connection terminal 6 are separated by an insulating packing 8. The sealing plate 5 is further provided with an inlet through which a non-aqueous electrolyte is injected, a sealant 9 for closing the injection inlet, and a battery safety valve 10.

The positive electrode includes a positive electrode current collector and a positive electrode material mixture layer formed on the positive electrode current collector. The negative electrode includes a negative electrode current collector and a negative electrode material mixture layer formed on the negative electrode current collector.

The positive electrode current collector can be any current collector. A current collector formed of aluminum, an aluminum alloy or the like is suitable, but the current collector is not limited thereto. The positive electrode current collector has a thickness of, for example, 5 to 100 µm.

The positive electrode material mixture layer contains a lithium-containing composite oxide as a positive electrode active material, and optionally a positive electrode conductive material and a positive electrode binder.

Examples of the conductive material include various conductive materials, such as graphites such as natural graphite and artificial graphite; carbon blacks such as acetylene black; and conductive fibers such as carbon fiber and metal fiber.

The amount of positive electrode conductive material contained in the positive electrode material mixture layer is preferably 50 parts by weight or less with respect to 100 parts by weight of the positive electrode active material, and more preferably, 30 parts by weight or less. In the case of using a graphite or carbon black as a positive electrode conductive material, it is preferable that the amount of positive electrode conductive material contained in the positive electrode material mixture layer is 10 parts by weight or less with respect to 100 parts by weight of the positive electrode active material.

As the positive electrode binder, any known binder can be used, such as polyvinylidene fluoride, polytetrafluoroethylene, styrene butadiene rubber or carboxymethyl cellulose.

When a liquid component used to dissolve and disperse the positive electrode binder in the production of a positive electrode material mixture layer and a washing solution used in the washing step in the production of a lithium-containing composite oxide are the same component, a solvent removing process, such as drying, that is performed after the washing step may be omitted. Accordingly, it is possible to simplify the production process for a lithium-containing composite oxide and reduce production costs. Because N-methyl-2-pyrrolidone (NMP) is used as a liquid component for dissolving a positive electrode binder such as polyvinylidene fluoride, by using NMP as a washing solution for washing the positive electrode active material, it is possible to simplify the solvent removing process after the washing step.

As the negative electrode current collector, any current collector can be used. For example, a metal foil made of a metal such as stainless steel, nickel, copper or titanium; a thin film made of carbon, a conductive resin or the like; or the like can be used, but the current collector is not limited thereto. A surface treatment may be performed on such a negative electrode current collector by using carbon, nickel, titanium or the like.

The negative electrode current collector has a thickness of, for example, 5 to 100 µm.

The negative electrode material mixture layer contains a negative electrode active material that capable of absorbing and desorbing lithium ions and a negative electrode binder. The negative electrode material mixture layer may optionally contain a negative electrode conductive material.

As the negative electrode active material, any negative electrode active material can be used. For example, a carbon material such as graphite or amorphous carbon; a single substance, alloy or composite material of silicon or tin can be used, but the negative electrode active material is not limited thereto.

As the negative electrode conductive material and the negative electrode binder, any of those listed for the positive electrode conductive material and the positive electrode binder can be used.

As the separator, a microporous thin film, woven fabric or non-woven fabric that has a high ion permeability, a prescribed mechanical strength and an insulating property can be used. Among them, in terms of improving the reliability of a non-aqueous secondary battery such as a lithium ion battery, it is suitable to use a microporous film that is made of a polyolefin, such as polypropylene or polyethylene, and that has superior durability and a shut-down function.

The separator typically has a thickness of 10 µm or more and 300 µm or less, and preferably, 10 µm or more and 40 µm or less.

The non-aqueous electrolyte contains a lithium salt and a non-aqueous solvent.

Examples of the non-aqueous solvent include aprotic organic solvents, such as carbonic acid esters such as ethylene carbonate, propylene carbonate, dimethyl carbonate and ethyl methyl carbonate; ethers such as tetrahydrofuran and 1,3-dioxolane; and carboxylic acid esters such as γ-butyrolactone. Such non-aqueous solvents may be used singly or in a combination of two or more.

As the lithium salt, any lithium salt, such as lithium hexafluorophosphate ($LiPF_6$), can be used.

In order to obtain a non-aqueous secondary battery described above, first, a positive electrode and a negative electrode are spirally wound with a separator for separating the electrodes therebetween to form a spirally wound electrode group 1. Then, the electrode group 1 is housed in a battery case 2 such that a positive electrode lead 3 and a negative electrode lead 4 each extend toward the opening side of the battery case 2, and the opening of the battery case 2 is sealed with an insulating plate 7 and a sealing plate 5. After that, a non-aqueous electrolyte is injected from an injection inlet formed in the sealing plate 5, and the injection inlet is then sealed with a sealant 9. In this manner, a non-aqueous secondary battery is obtained.

Thus far, an example in which the present invention is applied to a spirally wound prismatic non-aqueous secondary battery has been described, but the shape of the non-aqueous secondary battery is not limited thereto. It is possible to select any shape as appropriate according to the application of the non-aqueous secondary battery from a coin type, a cylindrical type, a sheet type, a button type, a flat type, a laminate type and so on. In addition, the present invention is not limited to a non-aqueous secondary battery for a compact device, and is also applicable as a large-format secondary battery with a large capacity, such as a power source for an electric vehicle and a power source for power storage.

Because the non-aqueous secondary battery described above includes a lithium-containing composite oxide obtained by the production method of the present invention as a positive electrode active material, the battery can exhibit superior battery characteristics, especially, superior cycle characteristics in a high temperature region depending on the combination with various battery materials. Moreover, because the generation of a gas from the positive electrode active material is suppressed, a high degree of reliability is obtained.

Thus, the non-aqueous secondary battery of the present invention is suitable as a non-aqueous secondary battery, such as a lithium ion battery or polymer electrolyte secondary battery and, especially, it is suitable as a lithium ion battery.

The present invention is very useful in the field of non-aqueous electrolyte secondary batteries such as lithium ion batteries.

EXAMPLES

Example 1

(1) Production of Lithium-Containing Composite Oxide

A saturated aqueous solution was prepared by adding cobalt sulfate and aluminum sulfate to an aqueous solution of nickel sulfate. The ratio of nickel, cobalt and aluminum contained in the saturated aqueous solution, when expressed in moles of the elements, was adjusted to 80:15:5. Subsequently, sodium hydroxide was added to the saturated aqueous solution to neutralize the solution, thereby generating an $Ni_{0.80}Co_{0.15}Al_{0.05}(OH)_2$ precipitate as a ternary hydroxide. The obtained precipitation product was filtered, washed with water, and then dried at 80° C.

Next, the ternary hydroxide was heated at 600° C. in the air for 10 hours to obtain $Ni_{0.80}Co_{0.15}Al_{0.05}O$ as a ternary oxide. Furthermore, lithium hydroxide monohydrate was added to the ternary oxide, and it was baked at 800° C. in an oxygen flow for 10 hours so as to obtain a lithium-containing composite oxide ($LiNi_{0.80}Co_{0.15}Al_{0.05}O_2$) as a baked product. The obtained lithium-containing composite oxide included lithium hydroxide and lithium carbonate. The obtained lithium-containing composite oxide was then pulverized and adjusted so as to have an average particle size (median value $D_{50}$ based on volume, the same applies hereinafter) of 20 μm.

Next, 100 g of the obtained lithium-containing composite oxide powder and 1000 mL of N-methyl-2-pyrrolidone (NMP) as a washing solution were stirred in a stirrer for one hour.

After stirring, the washing solution was removed through filtration, adjustment was made such that the solids content was 98 wt % or more, and then the washing solution was further removed by drying under a reduced pressure. Drying under a reduced pressure was performed to the degree that the amount of washing solution (NMP) remaining in the lithium-containing composite oxide was 300 ppm or less. The amount of washing solution remaining in the lithium-containing composite oxide was obtained by taking a sample from the lithium-containing composite oxide, extracting the residual washing solution in the sample with the use of an organic solvent, and calculating it based on the result of measurement by gas chromatography.

After that, sizing was performed to obtain a lithium-containing composite oxide powder represented by a composition formula: $LiNi_{0.80}Co_{0.15}Al_{0.05}O_2$. The particle size of the lithium-containing composite oxide powder was adjusted such that the average particle size after sizing was 20 μm.

(2) Production of Positive Electrode

A positive electrode material mixture paste was prepared by stirring 1 kg of the lithium-containing composite oxide powder obtained in (1) above, 0.5 kg of an NMP solution containing polyvinylidene fluoride (PVDF)(available from Kureha Chemical Industry Co., Ltd., #1320, solid concentration: 12 wt %), 40 g of acetylene black and an appropriate amount of NMP in a double arm kneader at a temperature of 30° C., for 30 minutes.

Next, the obtained positive electrode material mixture paste was applied onto both surfaces of a 20 μm thick aluminum foil as a current collector, and dried at 120° C. for 15 minutes. Then, the current collector was pressed using a roll press such that the total thickness of the positive electrode, or in other words, the total of the thickness of the current collector and the thickness of the layers made of the positive electrode material mixture paste was 160 μm. The diameter of a pair of rollers of the roll press was set to 40 cm, and the linear pressure indicating a pressure during pressing was set to 10000 N/cm.

The thus-obtained positive electrode was cut into a suitable size that could be inserted into a prismatic battery case with a height of 50 mm, a width of 34 mm and a thickness of 5 mm. A positive electrode lead was attached to a part of the positive electrode. The preparation of the positive electrode material mixture paste, the application of the positive electrode material mixture paste onto the current collector and the shaping of the positive electrode were all performed in an environment in which the dew point was maintained at −30° C. or less.

(3) Production of Negative Electrode

A negative electrode material mixture paste was prepared by stirring 3 kg of artificial graphite, 200 g of an aqueous dispersion containing modified styrene-butadiene rubber (available from Zeon Corporation, Japan, BM-400B, solids content: 40 wt %), 50 g of carboxymethyl cellulose and an appropriate amount of water in a double arm kneader.

Next, the obtained negative electrode material mixture paste was applied onto both surfaces of a 12 μm thick copper foil as a current collector, and dried at 120° C. Then, the current collector was drawn using a roll press such that the total thickness of the negative electrode, or in other words, the total of the thickness of the current collector and the thickness of the layers made of the negative electrode material mixture paste was 160 μm.

The thus-obtained negative electrode was cut into a suitable size that can be inserted into a prismatic battery case with a height of 50 mm, a width of 34 mm and a thickness of 5 mm. A negative electrode lead was attached to a part of the negative electrode.

(4) Preparation of Non-Aqueous Electrolyte

A non-aqueous solvent was prepared by mixing ethylene carbonate and dimethyl carbonate at a volume ratio of 1:3. $LiPF_6$ was dissolved in the non-aqueous solvent to obtain a non-aqueous electrolyte with a $LiPF_6$ concentration of 1.4 mol/dm$^3$. Then, in order to enhance the charge/discharge efficiency of the battery, vinylene carbonate as an additive was added to the non-aqueous electrolyte. The vinylene carbonate content was adjusted to 5 wt % of the entire non-aqueous solvent.

(5) Production of Non-Aqueous Secondary Battery

A prismatic non-aqueous secondary battery as shown in FIG. 1 was produced by using the positive electrode having a positive electrode lead, the negative electrode having a negative electrode lead and the non-aqueous electrolyte that were obtained in the above (2) to (4), and a composite film of polyethylene and polypropylene (available from Celgard Inc., product number: 2300, thickness: 25 µm) as a separator.

The thus-obtained non-aqueous secondary battery was a prismatic battery with a height of 50 mm, a width of 34 mm and a thickness 5 mm, and had a design capacity of 900 mAh.

Examples 2 to 13

A lithium-containing composite oxide and a non-aqueous secondary battery were produced in the same manner as in EXAMPLE 1, except that, instead of NMP, N-methyl formamide (EXAMPLE 2), N-methyl acetamide (EXAMPLE 3), N-methyl propionamide (EXAMPLE 4), N,N-dimethyl formamide (EXAMPLE 5), N-cyclohexyl pyrrolidone (EXAMPLE 6), N-dimethylimidazolidinone (DMI, EXAMPLE 7), N,N'-dimethyl propylene urea (EXAMPLE 8), dimethylsulfoxide (DMSO, EXAMPLE 9), sulfolane (EXAMPLE 10), acetonitrile (EXAMPLE 11), propylene carbonate (EXAMPLE 12) or dioxane (EXAMPLE 13) was used as a washing solution in an amount of 1000 mL.

Comparative Example 1

A lithium-containing composite oxide and a non-aqueous secondary battery were produced in the same manner as in EXAMPLE 1, except that the operation of stirring a lithium-containing composite oxide and a washing solution in a stirrer and the operation of filtration and drying under a reduced pressure after the stirring process were not performed.

Comparative Examples 2 and 3

A lithium-containing composite oxide and a non-aqueous secondary battery were produced in the same manner as in EXAMPLE 1, except that, instead of NMP, water (COMPARATIVE EXAMPLE 2) or acetone (COMPARATIVE EXAMPLE 3) was used as a washing solution in an amount of 1000 mL.

Example 14

100 g of a lithium-containing composite oxide represented by a composition formula: $LiNi_{0.80}Co_{0.15}Al_{0.05}O_2$, and 1000 mL of NMP were stirred in a stirrer for one hour. After stirring, the washing solution was removed through filtration, and adjustment was made such that the solids content was 95 wt % or more. Then, the lithium-containing composite oxide from which the washing solution had been removed was placed in a double arm kneader together with 6 g of powdered PVDF (available from Kureha Chemical Industry Co., Ltd.), 40 g of acetylene black and an appropriate amount of NMP, and stirred at a treatment temperature of 30° C. for 30 minutes. In this manner, a positive electrode material mixture paste was prepared. A non-aqueous secondary battery was produced in the same manner as in EXAMPLE 1, except that the thus-obtained positive electrode material mixture paste was used.

Example 15

A saturated aqueous solution was prepared by adding cobalt sulfate and manganese sulfate to an aqueous solution of nickel sulfate. The ratio of nickel, cobalt and manganese contained in the saturated aqueous solution, as expressed in moles of the elements, was adjusted to 50:20:30. Subsequently, sodium hydroxide was added to the saturated aqueous solution to neutralize the solution, thereby generating an $Ni_{0.50}Co_{0.20}Mn_{0.30}(OH)_2$ precipitate as a ternary hydroxide. The obtained precipitation product was filtered, washed with water, and dried at 80° C.

Next, the ternary hydroxide was heated at 600° C. in the air for 10 hours to obtain $Ni_{0.50}Co_{0.20}Mn_{0.30}O$ as a ternary oxide. Furthermore, lithium hydroxide was added to the ternary oxide, and it was baked at 800° C. in an air flow for 10 hours so as to obtain a lithium-containing composite oxide ($LiNi_{0.50}Co_{0.20}Mn_{0.30}O_2$) as a baked product. The obtained lithium-containing composite oxide included lithium hydroxide and lithium carbonate. The obtained lithium-containing composite oxide was then pulverized and adjusted so as to have an average particle size of 20 µm.

Next, 100 g of the obtained lithium-containing composite oxide powder and 1000 mL of NMP were stirred in a stirrer for one hour. After stirring, the washing solution was removed through filtration, adjustment was made such that the solids content was 98 wt % or more, and then the washing solution was further removed by drying under a reduced pressure. The degree of drying under a reduced pressure was adjusted to be the same as that of EXAMPLE 1.

After that, sizing was performed to obtain a lithium-containing composite oxide powder represented by a composition formula: $LiNi_{0.50}Co_{0.20}Mn_{0.30}O_2$. The particle size of the lithium-containing composite oxide powder was adjusted such that the average particle size after sizing was 20 µm. A non-aqueous secondary battery was produced in the same manner as in EXAMPLE 1, except that the thus-obtained lithium-containing composite oxide was used as a positive electrode active material.

Examples 16 and 17

A lithium-containing composite oxide and a non-aqueous secondary battery were produced in the same manner as in EXAMPLE 15, except that, instead of NMP, DMI (EXAMPLE 16) or DMSO (EXAMPLE 17) was used as a washing solution in an amount of 1000 mL.

Comparative Example 4

A lithium-containing composite oxide and a non-aqueous secondary battery were produced in the same manner as in EXAMPLE 15, except that the operation of stirring a lithium-containing composite oxide and a washing solution in a stirrer and the operation of filtration and drying under a reduced pressure after the stirring process were not performed.

Comparative Examples 5 and 6

A lithium-containing composite oxide and a non-aqueous secondary battery were produced in the same manner as in EXAMPLE 15, except that, instead of NMP, water (COMPARATIVE EXAMPLE 5) or acetone (COMPARATIVE EXAMPLE 6) was used as a washing solution in an amount of 1000 mL.

Example 18

A saturated aqueous solution was prepared by adding cobalt sulfate and manganese sulfate to an aqueous solution of nickel sulfate. The ratio of nickel, cobalt and manganese contained in the saturated aqueous solution, as expressed in moles of the elements, was adjusted to 1:1:1. Subsequently, sodium hydroxide was added to the saturated aqueous solution to neutralize the solution, thereby generating an $Ni_{1/3}Co_{1/3}Mn_{1/3}(OH)_2$ precipitate as a ternary hydroxide. The obtained precipitation product was filtered, washed with water, and dried at 80° C.

Next, the ternary hydroxide was heated at 600° C. in the air for 10 hours to obtain $Ni_{1/3}Co_{1/3}Mn_{1/3}O$ as a ternary oxide. Furthermore, lithium hydroxide was added to the ternary oxide, and it was baked at 800° C. in an oxygen flow for 10 hours so as to obtain a lithium-containing composite oxide ($LiNi_{1/3}Co_{1/3}Mn_{1/3}O_2$) as a baked product. The obtained lithium-containing composite oxide included lithium hydroxide and lithium carbonate. The obtained lithium-containing composite oxide was then pulverized and adjusted so as to have an average particle size of 20 µm.

Next, 100 g of the obtained lithium-containing composite oxide powder and 1000 mL of NMP were stirred in a stirrer for one hour. After stirring, the washing solution was removed through filtration, adjustment was made such that the solids content was 98 wt % or more, and then the washing solution was further removed by drying under a reduced pressure. The degree of drying under a reduced pressure was adjusted to be the same as that of EXAMPLE 1.

After that, sizing was performed to obtain a lithium-containing composite oxide powder represented by a composition formula: $LiNi_{1/3}Co_{1/3}Mn_{1/3}O_2$. The particle size of the lithium-containing composite oxide powder was adjusted such that the average particle size after sizing was 20 µm. A non-aqueous secondary battery was produced in the same manner as in EXAMPLE 1, except that the thus-obtained lithium-containing composite oxide was used as a positive electrode active material.

Examples 19 and 20

A lithium-containing composite oxide and a non-aqueous secondary battery were produced in the same manner as in EXAMPLE 18, except that, instead of NMP, DMI (EXAMPLE 19) or DMSO (EXAMPLE 20) was used as a washing solution in an amount of 1000 mL.

Comparative Example 7

A lithium-containing composite oxide and a non-aqueous secondary battery were produced in the same manner as in EXAMPLE 18, except that the operation of stirring a lithium-containing composite oxide and a washing solution in a stirrer and the operation of filtration and drying under a reduced pressure after the stirring process were not performed.

Comparative Examples 8 and 9

A lithium-containing composite oxide and a non-aqueous secondary battery were produced in the same manner as in EXAMPLE 18, except that, instead of NMP, water (COMPARATIVE EXAMPLE 8) or acetone (COMPARATIVE EXAMPLE 9) was used as a washing solution in an amount of 1000 mL.

Example 21

LiOH and $\gamma\text{-}Mn_2O_3$ were mixed such that Li and Mn had an equal number of moles, and the mixture was baked at 750° C. in an air flow for 12 hours so as to obtain a lithium-containing composite oxide ($LiMnO_4$) as a baked product. The obtained lithium-containing composite oxide included lithium hydroxide and lithium carbonate. The obtained lithium-containing composite oxide was then pulverized and adjusted so as to have an average particle size of 20 µm.

Next, 100 g of the obtained lithium-containing composite oxide powder and 1000 mL of NMP were stirred in a stirrer for one hour. After stirring, the washing solution was removed through filtration, adjustment was made such that the solids content was 98 wt % or more, and then the washing solution was further removed by drying under a reduced pressure. The degree of drying under a reduced pressure was adjusted to be the same as that of EXAMPLE 1.

After that, sizing was performed to obtain a lithium-containing composite oxide powder represented by a composition formula: $LiMnO_4$. The particle size of the lithium-containing composite oxide powder was adjusted such that the average particle size after sizing was 20 µm. A non-aqueous secondary battery was produced in the same manner as in EXAMPLE 1, except that the thus-obtained lithium-containing composite oxide was used as a positive electrode active material.

Examples 22 and 23

A lithium-containing composite oxide and a non-aqueous secondary battery were produced in the same manner as in EXAMPLE 21, except that, instead of NMP, DMI (EXAMPLE 22) or DMSO (EXAMPLE 23) was used as a washing solution in an amount of 1000 mL.

Comparative Example 10

A lithium-containing composite oxide and a non-aqueous secondary battery was produced in the same manner as in EXAMPLE 21, except that the operation of stirring a lithium-containing composite oxide and a washing solution in a stirrer and the operation of filtration and drying under a reduced pressure after the stirring process were not performed.

Comparative Examples 11 and 12

A lithium-containing composite oxide and a non-aqueous secondary battery were produced in the same manner as in EXAMPLE 21, except that, instead of NMP, water (COMPARATIVE EXAMPLE 11) or acetone (COMPARATIVE EXAMPLE 12) was used as a washing solution in an amount of 1000 mL.

Example 24

$Li_2Co_3$ and $Co_3O_4$ were mixed such that Li and Co had an equal number of moles, and the mixture was baked at 900° C. in an air flow for 10 hours so as to obtain a lithium-containing composite oxide ($LiCoO_2$) as a baked product. The obtained lithium-containing composite oxide included lithium hydroxide and lithium carbonate. The obtained lithium-containing composite oxide was then pulverized and adjusted so as to have an average particle size of 20 μm.

Next, 100 g of the obtained lithium-containing composite oxide powder and 1000 mL of NMP were stirred in a stirrer for one hour. After stirring, the washing solution was removed through filtration, adjustment was made such that the solids content was 98 wt % or more, and then the washing solution was further removed by drying under a reduced pressure. The degree of drying under a reduced pressure was adjusted to be the same as that of EXAMPLE 1.

After that, sizing was performed to obtain a lithium-containing composite oxide powder represented by a composition formula: $LiCoO_2$. The particle size of the lithium-containing composite oxide powder was adjusted such that the average particle size after sizing was 20 μm. A non-aqueous secondary battery was produced in the same manner as in EXAMPLE 1, except that the thus-obtained lithium-containing composite oxide was used as a positive electrode active material.

Examples 25 and 26

A lithium-containing composite oxide and a non-aqueous secondary battery were produced in the same manner as in EXAMPLE 24, except that, instead of NMP, DMI (EXAMPLE 25) or DMSO (EXAMPLE 26) was used as a washing solution in an amount of 1000 mL.

Comparative Example 13

A lithium-containing composite oxide and a non-aqueous secondary battery were produced in the same manner as in EXAMPLE 24, except that the operation of stirring a lithium-containing composite oxide and a washing solution in a stirrer and the operation of filtration and drying under a reduced pressure after the stirring process were not performed.

Comparative Examples 14 and 15

A lithium-containing composite oxide and a non-aqueous secondary battery were produced in the same manner as in EXAMPLE 24, except that, instead of NMP, water (COMPARATIVE EXAMPLE 14) or acetone (COMPARATIVE EXAMPLE 15) was used as a washing solution in an amount of 1000 mL.

Example 27

A saturated aqueous solution was prepared by adding magnesium sulfate to an aqueous solution of cobalt sulfate. The ratio of cobalt and manganese contained in the saturated aqueous solution, as expressed in moles, was adjusted to 98:2. Subsequently, sodium hydroxide was added to the saturated aqueous solution to neutralize the solution, thereby generating a $Co_{0.98}Mg_{0.02}(OH)_2$ precipitate as a binary hydroxide. The obtained precipitation product was filtered, washed with water, and dried at 80° C.

Next, the binary hydroxide was heated at 600° C. in the air for 10 hours to obtain $Co_{0.98}Mg_{0.02}O$ which was a binary oxide. Furthermore, lithium hydroxide was added to the binary oxide, and it was baked at 1000° C. in an air flow for 10 hours so as to obtain a lithium-containing composite oxide ($LiCo_{0.98}Mg_{0.02}O_2$) as a baked product. The obtained lithium-containing composite oxide included lithium hydroxide and lithium carbonate. The obtained lithium-containing composite oxide was then pulverized and adjusted so as to have an average particle size of 20 μm.

Next, 100 g of the obtained lithium-containing composite oxide powder and 1000 mL of NMP were stirred in a stirrer for one hour. After stirring, the washing solution was removed through filtration, adjustment was made such that the solids content was 98 wt % or more, and then the washing solution was further removed by drying under a reduced pressure. The degree of drying under a reduced pressure was adjusted to be the same as that of EXAMPLE 1.

After that, sizing was performed to obtain a lithium-containing composite oxide powder represented by a composition formula: $LiCo_{0.98}Mg_{0.02}O_2$. The particle size of the lithium-containing composite oxide powder was adjusted such that the average particle size after sizing was 20 μm. A non-aqueous secondary battery was produced in the same manner as in EXAMPLE 1, except that the thus-obtained lithium-containing composite oxide was used as a positive electrode active material.

Examples 28 and 29

A lithium-containing composite oxide and a non-aqueous secondary battery were produced in the same manner as in EXAMPLE 27, except that, instead of NMP, DMI (EXAMPLE 28) or DMSO (EXAMPLE 29) was used as a washing solution in an amount of 1000 mL.

Comparative Example 16

A lithium-containing composite oxide and a non-aqueous secondary battery were produced in the same manner as in EXAMPLE 27, except that the operation of stirring a lithium-containing composite oxide and a washing solution in a stirrer and the operation of filtration and drying under a reduced pressure after the stirring process were not performed.

Comparative Examples 17 and 18

A lithium-containing composite oxide and a non-aqueous secondary battery were produced in the same manner as in EXAMPLE 27, except that, instead of NMP, water (COMPARATIVE EXAMPLE 17) or acetone (COMPARATIVE EXAMPLE 18) was used as a washing solution in an amount of 1000 mL.

Examples 30 and 31

A lithium-containing composite oxide ($LiNi_{0.80}Co_{0.15}Al_{0.05}O_2$) was produced in the same manner as in EXAMPLE 1, except that, instead of the washing solution composed only of NMP, a solvent mixture (EXAMPLE 30) obtained by mixing NMP and water at a weight ratio of 80:20, or a solvent mixture (EXAMPLE 31) obtained by mixing DMSO and water at a weight ratio of 80:20 was used as a washing solution. A non-aqueous secondary battery was produced in the same manner as in EXAMPLE 1, except that the thus-obtained lithium-containing composite oxide was used as a positive electrode active material.

Examples 32 and 33

A lithium-containing composite oxide ($LiNi_{0.50}Co_{0.20}Mn_{0.30}O_2$) was produced in the same manner as in EXAMPLE 15 (EXAMPLE 32), and a lithium-containing composite oxide ($LiNi_{1/3}Co_{1/3}Mn_{1/3}O_2$) was produced in the same manner as in EXAMPLE 18 (EXAMPLE 33), except that, instead of the washing solution composed only of NMP, a solvent mixture obtained by mixing NMP and water at a weight ratio of 80:20 was used as a washing solution. In each example, a non-aqueous secondary battery was produced in the same manner as in EXAMPLE 1, except that the thus-obtained lithium-containing composite oxide was used as a positive electrode active material.

Examples 34 to 36

A lithium-containing composite oxide ($LiNi_{0.80}Co_{0.15}Al_{0.05}O_2$) was produced in the same manner as in EXAMPLE 21 (EXAMPLE 34), a lithium-containing composite oxide ($LiNi_{0.50}Co_{0.20}Mn_{0.30}O_2$) was produced in the same manner as in EXAMPLE 24 (EXAMPLE 35), and a lithium-containing composite oxide ($LiNi_{1/3}Co_{1/3}Mn_{1/3}O_2$) was produced in the same manner as in EXAMPLE 27 (EXAMPLE 36), except that, instead of the washing solution composed only of NMP, a solvent mixture obtained by mixing NMP and water at a weight ratio of 80:20 was used as a washing solution. Furthermore, in each example, a non-aqueous secondary battery was produced in the same manner as in EXAMPLE 1, except that the thus-obtained lithium-containing composite oxide was used as a positive electrode active material.

Example 37

100 g of a lithium-containing composite oxide powder represented by a composition formula, $LiNi_{0.80}Co_{0.15}Al_{0.05}O_2$, and 1000 mL of water were stirred in a stirrer for 15 minutes (water-washing step). After stirring, water was removed through filtration, adjustment was made such that the solids content was 98 wt % or more, and then water was further removed by drying under a reduced pressure. Drying under a reduced pressure was performed to the degree that the amount of water remaining in the lithium-containing composite oxide was 800 ppm or less.

Subsequently, 100 g of the lithium-containing composite oxide that had been dried under a reduced pressure and 1000 mL of NMP as a washing solution were stirred in a stirrer for one hour (washing step). After stirring, the washing solution was removed through filtration, adjustment was made such that the solids content was 98 wt % or more, and then the washing solution was further removed by drying under a reduced pressure. Drying under a reduced pressure was performed to the degree that the amount of washing solution (NMP) remaining in the lithium-containing composite oxide was 300 ppm or less.

After that, sizing was performed to obtain a lithium-containing composite oxide powder represented by a composition formula: $LiNi_{0.80}Co_{0.15}Al_{0.05}O_2$. The particle size of the lithium-containing composite oxide powder was adjusted such that the average particle size after sizing was 20 μm. A non-aqueous secondary battery was produced in the same manner as in EXAMPLE 1, except that the thus-obtained lithium-containing composite oxide was used as a positive electrode active material.

Examples 38 to 42

As a lithium-containing composite oxide, $LiNi_{0.50}Co_{0.20}Mn_{0.30}O_2$ was used in EXAMPLE 38, $LiNi_{1/3}Co_{1/3}Mn_{1/3}O_2$ was used in EXAMPLE 39, $LiMn_2O_4$ was used in EXAMPLE 40, $LiCoO_2$ was used in EXAMPLE 41, and $LiCo_{0.98}Mg_{0.02}O_2$ was used in EXAMPLE 42.

In each example, a water-washing step, a washing step, removal of a washing solution, drying under a reduced pressure and sizing were performed in the same manner as in EXAMPLE 37, except that the above lithium-containing composite oxide was used. Furthermore, in each example, a non-aqueous secondary battery was produced in the same manner as in EXAMPLE 1, except that the thus-obtained lithium-containing composite oxide was used as a positive electrode active material.

Example 43

100 g of a lithium-containing composite oxide ($LiNi_{0.80}Co_{0.15}Al_{0.05}O_2$) powder obtained in the same manner as in EXAMPLE 1 and 1000 mL of a solvent mixture obtained by mixing NMP and water at a weight ratio of 20:80 as a first washing solution were stirred in a stirrer for 15 minutes (first washing step). After stirring, the first washing solution was removed through filtration, adjustment was made such that the solids content was 98 wt % or more, and then the washing solution was further removed by drying under a reduced pressure. Drying under a reduced pressure was performed to the degree that the amount of the first washing solution remaining in the lithium-containing composite oxide was 800 ppm or less.

After the first washing step, 100 g of the lithium-containing composite oxide that had been dried under a reduced pressure and 1000 mL of a solvent mixture obtained by mixing NMP and water at a weight ratio of 50:50 as a second washing solution were stirred in a stirrer for one hour (second washing step). After stirring, the second washing solution was removed through filtration, adjustment was made such that the solids content was 98 wt % or more, and then the washing solution was further removed by drying under a reduced pressure.

Furthermore, after the second washing step, 100 g of the lithium-containing composite oxide that had been dried under a reduced pressure and 1000 mL of a solvent mixture obtained by mixing NMP and water at a weight ratio of 80:20 as a third washing solution were stirred in a stirrer for one hour (third washing step). After stirring, the third washing solution was removed through filtration, adjustment was made such that the solids content was 98 wt % or more, and then the washing solution was further removed by drying under a reduced pressure. Drying under a reduced pressure was performed to the degree that the amount of the third washing solution remaining in the lithium-containing composite oxide was 300 ppm or less.

After that, sizing was performed to obtain a lithium-containing composite oxide powder represented by a composition formula: $LiNi_{0.80}Co_{0.15}Al_{0.05}O_2$. The particle size of the lithium-containing composite oxide powder was adjusted such that the average particle size after sizing was 20 μm. A non-aqueous secondary battery was produced in the same manner as in EXAMPLE 1, except that the thus-obtained lithium-containing composite oxide was used as a positive electrode active material.

Example 44

A lithium-containing composite oxide ($LiNi_{0.80}Co_{0.15}Al_{0.05}O_2$) powder obtained in the same manner as in EXAMPLE 1 was subjected to a first washing step, a second washing step and a third washing step in the same manner as in EXAMPLE 43.

Furthermore, after the third washing step, 100 g of the lithium-containing composite oxide that had been dried under a reduced pressure and 1000 mL of NMP as a fourth washing solution were stirred in a stirrer for one hour (fourth washing step). After stirring, the washing solution was removed through filtration, adjustment was made such that the solids content was 98 wt % or more, and then the washing solution was further removed by drying under a reduced pressure. Drying under a reduced pressure was performed to the degree that the amount of the fourth washing solution remaining in the lithium-containing composite oxide was 300 ppm or less.

After that, sizing was performed to obtain a lithium-containing composite oxide powder represented by a composition formula: $LiNi_{0.80}Co_{0.15}Al_{0.05}O_2$. The particle size of the lithium-containing composite oxide powder was adjusted such that the average particle size after sizing was 20 μm. A non-aqueous secondary battery was produced in the same manner as in EXAMPLE 1, except that the thus-obtained lithium-containing composite oxide was used as a positive electrode active material.

Example 45

100 g of a lithium-containing composite oxide ($LiNi_{0.80}Co_{0.15}Al_{0.05}O_2$) powder obtained in the same manner as in EXAMPLE 1 and 1000 mL of water were stirred in a stirrer for 15 minutes (water-washing step). After stirring, water was removed through filtration, adjustment was made such that the solids content was 98 wt % or more, and then water was further removed by drying under a reduced pressure. Drying under a reduced pressure was performed to the degree that the amount of water remaining in the lithium-containing composite oxide was 800 ppm or less.

After the water-washing step, 100 g of the lithium-containing composite oxide that had been dried under a reduced pressure and 1000 mL of a solvent mixture obtained by mixing NMP and water at a weight ratio of 20:80 as a first washing solution were stirred in a stirrer for one hour (first washing step). After stirring, the first washing solution was removed through filtration, adjustment was made such that the solids content was 98 wt % or more, and then the washing solution was further removed by drying under a reduced pressure.

After the first washing step, 100 g of the lithium-containing composite oxide that had been dried under a reduced pressure and 1000 mL of a solvent mixture obtained by mixing NMP and water at a weight ratio of 50:50 as a second washing solution were stirred in a stirrer for one hour (second washing step). After stirring, the second washing solution was removed through filtration, adjustment was made such that the solids content was 98 wt % or more, and then the washing solution was further removed by drying under a reduced pressure.

After the second washing step, 100 g of the lithium-containing composite oxide that had been dried under a reduced pressure and 1000 mL of a solvent mixture obtained by mixing NMP and water at a weight ratio of 80:20 as a third washing solution were stirred in a stirrer for one hour (third washing step). After stirring, the third washing solution was removed through filtration, adjustment was made such that the solids content was 98 wt % or more, and then the washing solution was further removed by drying under a reduced pressure. Drying under a reduced pressure was performed to the degree that the amount of the third washing solution remaining in the lithium-containing composite oxide was 300 ppm or less.

After that, sizing was performed to obtain a lithium-containing composite oxide powder represented by a composition formula: $LiNi_{0.80}Co_{0.15}Al_{0.05}O_2$. The particle size of the lithium-containing composite oxide powder was adjusted such that the average particle size after sizing was 20 μm. A non-aqueous secondary battery was produced in the same manner as in EXAMPLE 1, except that the thus-obtained lithium-containing composite oxide was used as a positive electrode active material.

Example 46

A lithium-containing composite oxide ($LiNi_{0.80}Co_{0.15}Al_{0.05}O_2$) powder obtained in the same manner as in EXAMPLE 1 was subjected to a water-washing step, a first washing step, a second washing step and a third washing step in the same manner as in EXAMPLE 45.

After the third washing step, 100 g of the lithium-containing composite oxide that had been dried under a reduced pressure and 1000 mL of NMP as a fourth washing solution were stirred in a stirrer for one hour (fourth washing step). After stirring, the washing solution was removed through filtration, adjustment was made such that the solids content was 98 wt % or more, and then the washing solution was further removed by drying under a reduced pressure. Drying under a reduced pressure was performed to the degree that the amount of the fourth washing solution remaining in the lithium-containing composite oxide was 300 ppm or less.

After that, sizing was performed to obtain a lithium-containing composite oxide powder represented by a composition formula: $LiNi_{0.80}Co_{0.15}Al_{0.05}O_2$. The particle size of the lithium-containing composite oxide powder was adjusted such that the average particle size after sizing was 20 μm. A non-aqueous secondary battery was produced in the same manner as in EXAMPLE 1, except that the thus-obtained lithium-containing composite oxide was used as a positive electrode active material.

Example 47

100 g of a lithium-containing composite oxide ($LiNi_{0.80}Co_{0.15}Al_{0.05}O_2$) powder obtained in the same manner as in EXAMPLE 1 and 1000 mL of water were stirred in a stirrer for 15 minutes (water-washing step).

After the water-washing step, water was removed through filtration, and adjustment was made such that the solids content was 98 wt % or more. Then, 100 g (dried weight) of the filtered lithium-containing composite oxide and 1000 mL of a solvent mixture obtained by mixing NMP and water at a weight ratio of 20:80 as a first washing solution were stirred in a stirrer for 15 minutes (first washing step). After stirring, the first washing solution was removed through filtration, and adjustment was made such that the solids content was 98 wt % or more.

Furthermore, 100 g (dried weight) of the filtered lithium-containing composite oxide and 1000 mL of a solvent mixture obtained by mixing NMP and water at a weight ratio of 50:50 as a second washing solution were stirred in a stirrer for 15 minutes (second washing step). After stirring, the second washing solution was removed through filtration, and adjustment was made such that the solids content was 98 wt % or more.

Furthermore, 100 g (dried weight) of the filtered lithium-containing composite oxide and 1000 mL of a solvent mixture obtained by mixing NMP and water at a weight ratio of 80:20 as a third washing solution were stirred in a stirrer for 15 minutes (third washing step). After stirring, the third washing solution was removed through filtration, and adjustment was made such that the solids content was 98 wt % or more.

Furthermore, 100 g (dried weight) of the filtered lithium-containing composite oxide and 1000 mL of NMP as a fourth washing solution were stirred in a stirrer for 15 minutes (fourth washing step). After stirring, the fourth washing solution was removed through filtration, adjustment was made such that the solids content was 98 wt % or more, and then the washing solution was further removed by drying under a reduced pressure. Drying under a reduced pressure was performed to the degree that the amount of the fourth washing solution remaining in the lithium-containing composite oxide was 300 ppm or less.

After that, sizing was performed to obtain a lithium-containing composite oxide powder represented by a composition formula: $LiNi_{0.80}Co_{0.15}Al_{0.05}O_2$. The particle size of the lithium-containing composite oxide powder was adjusted such that the average particle size after sizing was 20 μm. A non-aqueous secondary battery was produced in the same manner as in EXAMPLE 1, except that the thus-obtained lithium-containing composite oxide was used as a positive electrode active material.

In EXAMPLE 47, (a) the stirring time for which the lithium-containing composite oxide and the water or washing solution were stirred was set to 15 minutes in the water-washing step and the respective washing steps, and (b) only filtration was performed after the water-washing step as well as the first to third washing steps, and then the next step was performed without performing the process of removing water or washing solution by drying under a reduced pressure. EXAMPLE 47 is the same as EXAMPLE 46 except for these differences (a) and (b).

Example 48

100 g of a lithium-containing composite oxide ($LiNi_{0.80}Co_{0.15}Al_{0.05}O_2$) powder obtained in the same manner as in EXAMPLE 1 and 1000 mL of a solvent mixture obtained by mixing NMP and water at a weight ratio of 80:20 as a first washing solution were stirred in a stirrer for 15 minutes (first washing step). After stirring, the first washing solution was removed through filtration, adjustment was made such that the solids content was 98 wt % or more, and then the washing solution was further removed by drying under a reduced pressure. Drying under a reduced pressure was performed to the degree that the amount of the first washing solution remaining in the lithium-containing composite oxide was 800 ppm or less.

Subsequently, after the first washing step, 100 g of the lithium-containing composite oxide that had been dried under a reduced pressure and 1000 mL of a solvent mixture obtained by mixing NMP and water at a weight ratio of 50:50 as a second washing solution were stirred in a stirrer for one hour (second washing step). After stirring, the second washing solution was removed through filtration, adjustment was made such that the solids content was 98 wt % or more, and then the washing solution was further removed by drying under a reduced pressure.

Furthermore, after the second washing step, 100 g of the lithium-containing composite oxide that had been dried under a reduced pressure and 1000 mL of a solvent mixture obtained by mixing NMP and water at a weight ratio of 20:80 as a third washing solution were stirred in a stirrer for one hour (third washing step). After stirring, the third washing solution was removed through filtration, adjustment was made such that the solids content was 98 wt % or more, and then the washing solution was further removed by drying under a reduced pressure. Drying under a reduced pressure was performed to the degree that the amount of the third washing solution remaining in the lithium-containing composite oxide was 300 ppm or less.

After that, sizing was performed to obtain a lithium-containing composite oxide powder represented by a composition formula: $LiNi_{0.80}Co_{0.15}Al_{0.05}O_2$. The particle size of the lithium-containing composite oxide powder was adjusted such that the average particle size after sizing was 20 μm. A non-aqueous secondary battery was produced in the same manner as in EXAMPLE 1, except that the thus-obtained lithium-containing composite oxide was used as a positive electrode active material.

Example 49

100 g of a lithium-containing composite oxide ($LiNi_{0.80}Co_{0.15}Al_{0.05}O_2$) powder obtained in the same manner as in EXAMPLE 1 and 1000 mL of a solvent mixture obtained by mixing acetone and water at a weight ratio of 20:80 as a first washing solution were stirred in a stirrer for 15 minutes (first washing step). After stirring, the first washing solution was removed through filtration, adjustment was made such that the solids content was 98 wt % or more, and then the washing solution was further removed by drying under a reduced pressure. Drying under a reduced pressure was performed to the degree that the amount of the first washing solution remaining in the lithium-containing composite oxide was 800 ppm or less.

Subsequently, after the first washing step, 100 g of the lithium-containing composite oxide that had been dried under a reduced pressure and 1000 mL of a solvent mixture obtained by mixing acetone and water at a weight ratio of 50:50 as a second washing solution were stirred in a stirrer for one hour (second washing step). After stirring, the second washing solution was removed through filtration, adjustment was made such that the solids content was 98 wt % or more, and then the washing solution was further removed by drying under a reduced pressure.

Furthermore, after the second washing step, 100 g of the lithium-containing composite oxide that had been dried under a reduced pressure and 1000 mL of a solvent mixture obtained by mixing acetone and water at a weight ratio of 80:20 as a third washing solution were stirred in a stirrer for one hour (third washing step). After stirring, the third washing solution was removed through filtration, adjustment was made such that the solids content was 98 wt % or more, and then the washing solution was further removed by drying under a reduced pressure. Drying under a reduced pressure was performed to the degree that the amount of the third washing solution remaining in the lithium-containing composite oxide was 300 ppm or less.

After that, sizing was performed to obtain a lithium-containing composite oxide powder represented by a composition formula: $LiNi_{0.80}Co_{0.15}Al_{0.05}O_2$. The particle size of the lithium-containing composite oxide powder was adjusted such that the average particle size after sizing was 20 μm. A non-aqueous secondary battery was produced in the same manner as in EXAMPLE 1, except that the thus-obtained lithium-containing composite oxide was used as a positive electrode active material.

Example 50

A lithium-containing composite oxide ($LiNi_{0.80}Co_{0.15}Al_{0.05}O_2$) powder obtained in the same manner as in EXAMPLE 1 was subjected to a first washing step, a second washing step and a third washing step in the same manner as in EXAMPLE 49.

After the third washing step, 100 g of the lithium-containing composite oxide that had been dried under a reduced pressure and 1000 mL of acetone as a fourth washing solution were stirred in a stirrer for one hour (fourth washing step).

After stirring, the washing solution was removed through filtration, adjustment was made such that the solids content was 98 wt % or more, and then the washing solution was further removed by drying under a reduced pressure. Drying under a reduced pressure was performed to the degree that the amount of the fourth washing solution remaining in the lithium-containing composite oxide was 300 ppm or less.

After that, sizing was performed to obtain a lithium-containing composite oxide powder represented by a composition formula: $LiNi_{0.80}Co_{0.15}Al_{0.05}O_2$. The particle size of the lithium-containing composite oxide powder was adjusted such that the average particle size after sizing was 20 μm. A non-aqueous secondary battery was produced in the same manner as in EXAMPLE 1, except that the thus-obtained lithium-containing composite oxide was used as a positive electrode active material.

Evaluation of Physical Properties of Non-Aqueous Secondary Battery (1) Cycle Test Each of the non-aqueous secondary batteries obtained in the above examples and comparative examples was charged and discharged under the following conditions at an ambient temperature of 45° C.

The battery was first subjected to constant voltage charging at 4.2 V with a maximum current value of 0.9 A. Charging was ended when the current value decreased to 50 mA. After that, constant current discharging was performed at 0.9 A. Discharging was ended when the voltage value decreased to 3.0 V. The interval between the charging process and the discharging process was set to 30 minutes. This charge/discharge cycle was taken as one cycle, and repeated 500 times. Then, the rate of the discharge capacity at the 500th cycle to the discharge capacity at the first cycle was calculated in percent, and defined as the capacity retention rate (%).

(2) Measurement of Battery Thickness

After being subjected to the above cycle test (500 cycles), each of the non-aqueous secondary batteries obtained in the above examples and comparative examples was allowed to cool until the battery temperature reached 25° C. After cooling, the battery thickness (mm) when the battery temperature was 25° C. was measured, and it was compared with the battery thickness before the cycle test.

The evaluation results are shown in Tables 1 to 8. In Tables 1 to 8, "Battery Thickness" indicates a thickness (mm) after the cycle test, and "Amount of Change" indicates a value (Δ/mm) obtained by subtracting a battery thickness before the cycle test from a battery thickness after the cycle test. "Ac" written in the "Washing Solution" column of Table 8 stands for acetone.

TABLE 1

| | | | Physical Properties | |
| --- | --- | --- | --- | --- |
| | Washing Solution | Composition of Lithium Composite Oxide | Battery Thickness ((Amount of Change)/mm) | Capacity Retention Rate |
| EXAMPLE 1 | NMP* | $LiNi_{0.80}Co_{0.15}Al_{0.05}O_2$ | 5.0 (Δ0.1) | 75% |
| EXAMPLE 2 | N-methyl formamide | $LiNi_{0.80}Co_{0.15}Al_{0.05}O_2$ | 4.9 (Δ0.05) | 76% |
| EXAMPLE 3 | N-methyl acetamide | $LiNi_{0.80}Co_{0.15}Al_{0.05}O_2$ | 4.9 (Δ0.0) | 77% |
| EXAMPLE 4 | N-methyl propionamide | $LiNi_{0.80}Co_{0.15}Al_{0.05}O_2$ | 4.9 (Δ0.0) | 76% |
| EXAMPLE 5 | N,N-dimethyl formamide | $LiNi_{0.80}Co_{0.15}Al_{0.05}O_2$ | 5.0 (Δ0.1) | 76% |
| EXAMPLE 6 | N-cyclohexyl pyrrolidone | $LiNi_{0.80}Co_{0.15}Al_{0.05}O_2$ | 4.9 (Δ0.0) | 75% |
| EXAMPLE 7 | DMI | $LiNi_{0.80}Co_{0.15}Al_{0.05}O_2$ | 4.9 (Δ0.0) | 75% |
| COMPARATIVE EXAMPLE 1 | — | $LiNi_{0.80}Co_{0.15}Al_{0.05}O_2$ | 5.7 (Δ0.8) | 55% |
| COMPARATIVE EXAMPLE 2 | Water | $LiNi_{0.80}Co_{0.15}Al_{0.05}O_2$ | 5.3 (Δ0.4) | 57% |
| COMPARATIVE EXAMPLE 3 | Acetone | $LiNi_{0.80}Co_{0.15}Al_{0.05}O_2$ | 5.7 (Δ0.8) | 55% |

*EXAMPLE 1 and EXAMPLE 14 shown in Table 2 differ in the process after the washing step.

TABLE 2

| | | | Physical Properties | |
| --- | --- | --- | --- | --- |
| | Washing Solution | Composition of Lithium Composite Oxide | Battery Thickness ((Amount of Change)/mm) | Capacity Retention Rate |
| EXAMPLE 8 | N,N'-dimethyl propylene urea | $LiNi_{0.80}Co_{0.15}Al_{0.05}O_2$ | 4.9 (Δ0.0) | 78% |
| EXAMPLE 9 | DMSO | $LiNi_{0.80}Co_{0.15}Al_{0.05}O_2$ | 5.0 (Δ0.1) | 76% |
| EXAMPLE 10 | Sulfolane | $LiNi_{0.80}Co_{0.15}Al_{0.05}O_2$ | 5.0 (Δ0.1) | 73% |
| EXAMPLE 11 | Acetonitrile | $LiNi_{0.80}Co_{0.15}Al_{0.05}O_2$ | 5.0 (Δ0.1) | 78% |
| EXAMPLE 12 | Propylene carbonate | $LiNi_{0.80}Co_{0.15}Al_{0.05}O_2$ | 5.0 (Δ0.1) | 77% |
| EXAMPLE 13 | Dioxane | $LiNi_{0.80}Co_{0.15}Al_{0.05}O_2$ | 4.9 (Δ0.0) | 75% |
| EXAMPLE 14 | NMP* | $LiNi_{0.80}Co_{0.15}Al_{0.05}O_2$ | 4.9 (Δ0.0) | 71% |
| COMPARATIVE EXAMPLE 1 | — | $LiNi_{0.80}Co_{0.15}Al_{0.05}O_2$ | 5.7 (Δ0.8) | 55% |
| COMPARATIVE EXAMPLE 2 | Water | $LiNi_{0.80}Co_{0.15}Al_{0.05}O_2$ | 5.3 (Δ0.4) | 57% |
| COMPARATIVE EXAMPLE 3 | Acetone | $LiNi_{0.80}Co_{0.15}Al_{0.05}O_2$ | 5.7 (Δ0.8) | 55% |

*EXAMPLE 14 and EXAMPLE 1 shown in Table 1 differ in the process after the washing step.

TABLE 3

| | Washing Solution | Composition of Lithium Composite Oxide | Physical Properties Battery Thickness ((Amount of Change)/mm) | Capacity Retention Rate |
|---|---|---|---|---|
| EXAMPLE 15 | NMP | $LiNi_{0.50}Co_{0.20}Mn_{0.30}O_2$ | 4.9 ($\Delta$0.0) | 81% |
| EXAMPLE 16 | DMI | $LiNi_{0.50}Co_{0.20}Mn_{0.30}O_2$ | 4.9 ($\Delta$0.0) | 81% |
| EXAMPLE 17 | DMSO | $LiNi_{0.50}Co_{0.20}Mn_{0.30}O_2$ | 4.9 ($\Delta$0.0) | 83% |
| COMPARATIVE EXAMPLE 4 | — | $LiNi_{0.50}Co_{0.20}Mn_{0.30}O_2$ | 5.3 ($\Delta$0.4) | 61% |
| COMPARATIVE EXAMPLE 5 | Water | $LiNi_{0.50}Co_{0.20}Mn_{0.30}O_2$ | 5.2 ($\Delta$0.3) | 65% |
| COMPARATIVE EXAMPLE 6 | Acetone | $LiNi_{0.50}Co_{0.20}Mn_{0.30}O_2$ | 5.3 ($\Delta$0.4) | 65% |
| EXAMPLE 18 | NMP | $LiNi_{1/3}Co_{1/3}Mn_{1/3}O_2$ | 4.9 ($\Delta$0.0) | 82% |
| EXAMPLE 19 | DMI | $LiNi_{1/3}Co_{1/3}Mn_{1/3}O_2$ | 4.9 ($\Delta$0.0) | 81% |
| EXAMPLE 20 | DMSO | $LiNi_{1/3}Co_{1/3}Mn_{1/3}O_2$ | 4.9 ($\Delta$0.0) | 82% |
| COMPARATIVE EXAMPLE 7 | — | $LiNi_{1/3}Co_{1/3}Mn_{1/3}O_2$ | 5.1 ($\Delta$0.2) | 61% |
| COMPARATIVE EXAMPLE 8 | Water | $LiNi_{1/3}Co_{1/3}Mn_{1/3}O_2$ | 5.1 ($\Delta$0.2) | 62% |
| COMPARATIVE EXAMPLE 9 | Acetone | $LiNi_{1/3}Co_{1/3}Mn_{1/3}O_2$ | 5.1 ($\Delta$0.2) | 64% |

TABLE 4

| | Washing Solution | Composition of Lithium Composite Oxide | Physical Properties Battery Thickness ((Amount of Change)/mm) | Capacity Retention Rate |
|---|---|---|---|---|
| EXAMPLE 21 | NMP | $LiMn_2O_4$ | 4.9 ($\Delta$0.0) | 77% |
| EXAMPLE 22 | DMI | $LiMn_2O_4$ | 4.9 ($\Delta$0.0) | 74% |
| EXAMPLE 23 | DMSO | $LiMn_2O_4$ | 4.9 ($\Delta$0.0) | 74% |
| COMPARATIVE EXAMPLE 10 | — | $LiMn_2O_4$ | 5.1 ($\Delta$0.2) | 71% |
| COMPARATIVE EXAMPLE 11 | Water | $LiMn_2O_4$ | 5.2 ($\Delta$0.3) | 69% |
| COMPARATIVE EXAMPLE 12 | Acetone | $LiMn_2O_4$ | 5.2 ($\Delta$0.3) | 72% |
| EXAMPLE 24 | NMP | $LiCoO_2$ | 4.9 ($\Delta$0.05) | 81% |
| EXAMPLE 25 | DMI | $LiCoO_2$ | 4.9 ($\Delta$0.05) | 82% |
| EXAMPLE 26 | DMSO | $LiCoO_2$ | 4.9 ($\Delta$0.05) | 81% |
| COMPARATIVE EXAMPLE 13 | — | $LiCoO_2$ | 5.1 ($\Delta$0.25) | 75% |
| COMPARATIVE EXAMPLE 14 | Water | $LiCoO_2$ | 5.2 ($\Delta$0.35) | 73% |
| COMPARATIVE EXAMPLE 15 | Acetone | $LiCoO_2$ | 5.1 ($\Delta$0.25) | 72% |

TABLE 5

| | Washing Solution | Composition of Lithium Composite Oxide | Physical Properties Battery thickness ((Amount of Change)/mm) | Capacity Retention Rate |
|---|---|---|---|---|
| EXAMPLE 27 | NMP | $LiCo_{0.98}Mg_{0.02}O_2$ | 4.9 ($\Delta$0.0) | 81% |
| EXAMPLE 28 | DMI | $LiCo_{0.98}Mg_{0.02}O_2$ | 4.9 ($\Delta$0.0) | 81% |
| EXAMPLE 29 | DMSO | $LiCo_{0.98}Mg_{0.02}O_2$ | 4.9 ($\Delta$0.0) | 82% |
| COMPARATIVE EXAMPLE 16 | — | $LiCo_{0.98}Mg_{0.02}O_2$ | 5.1 ($\Delta$0.2) | 75% |
| COMPARATIVE EXAMPLE 17 | Water | $LiCo_{0.98}Mg_{0.02}O_2$ | 5.2 ($\Delta$0.3) | 70% |
| COMPARATIVE EXAMPLE 18 | Acetone | $LiCo_{0.98}Mg_{0.02}O_2$ | 5.2 ($\Delta$0.3) | 76% |

TABLE 6

|  | Washing Solution | Composition of Lithium Composite Oxide | Physical Properties | |
|---|---|---|---|---|
|  |  |  | Battery Thickness ((Amount of Change)/mm) | Capacity Retention Rate |
| EXAMPLE 30 | NMP + Water (80:20) | $LiNi_{0.80}Co_{0.15}Al_{0.05}O_2$ | 5.0 ($\Delta$0.1) | 81% |
| EXAMPLE 31 | DMSO + Water (80:20) | $LiNi_{0.80}Co_{0.15}Al_{0.05}O_2$ | 5.0 ($\Delta$0.1) | 84% |
| EXAMPLE 32 | NMP + Water (80:20) | $LiNi_{0.50}Co_{0.20}Mn_{0.30}O_2$ | 4.9 ($\Delta$0.0) | 85% |
| EXAMPLE 33 | NMP + Water (80:20) | $LiNi_{1/3}Co_{1/3}Mn_{1/3}O_2$ | 4.9 ($\Delta$0.0) | 85% |
| EXAMPLE 34 | NMP + Water (80:20) | $LiMn_2O_4$ | 4.9 ($\Delta$0.0) | 81% |
| EXAMPLE 35 | NMP + Water (80:20) | $LiCoO_2$ | 4.9 ($\Delta$0.0) | 82% |
| EXAMPLE 36 | NMP + Water (80:20) | $LiCo_{0.98}Mg_{0.02}O_2$ | 4.9 ($\Delta$0.0) | 81% |
| COMPARATIVE EXAMPLE 2 | Water | $LiNi_{0.80}Co_{0.15}Al_{0.05}O_2$ | 5.3 ($\Delta$0.4) | 57% |
| COMPARATIVE EXAMPLE 5 | Water | $LiNi_{0.50}Co_{0.20}Mn_{0.30}O_2$ | 5.2 ($\Delta$0.3) | 65% |
| COMPARATIVE EXAMPLE 8 | Water | $LiNi_{1/3}Co_{1/3}Mn_{1/3}O_2$ | 5.1 ($\Delta$0.2) | 62% |
| COMPARATIVE EXAMPLE 11 | Water | $LiMn_2O_4$ | 5.2 ($\Delta$0.3) | 69% |
| COMPARATIVE EXAMPLE 14 | Water | $LiCoO_2$ | 5.2 ($\Delta$0.35) | 73% |
| COMPARATIVE EXAMPLE 17 | Water | $LiCo_{0.98}Mg_{0.02}O_2$ | 5.2 ($\Delta$0.3) | 70% |

TABLE 7

|  | Washing Solution | | Composition of Lithium Composite Oxide | Physical Properties | |
|---|---|---|---|---|---|
|  | Water-Washing Step | Washing Step |  | Battery Thickness ((Amount of Change)/mm) | Capacity Retention Rate |
| EXAMPLE 37 | Water | NMP | $LiNi_{0.80}Co_{0.15}Al_{0.05}O_2$ | 4.9 ($\Delta$0.0) | 78% |
| EXAMPLE 38 | Water | NMP | $LiNi_{0.50}Co_{0.20}Mn_{0.30}O_2$ | 4.9 ($\Delta$0.0) | 81% |
| EXAMPLE 39 | Water | NMP | $LiNi_{1/3}Co_{1/3}Mn_{1/3}O_2$ | 4.9 ($\Delta$0.0) | 82% |
| EXAMPLE 40 | Water | NMP | $LiMn_2O_4$ | 4.9 ($\Delta$0.0) | 80% |
| EXAMPLE 41 | Water | NMP | $LiCoO_2$ | 4.9 ($\Delta$0.0) | 83% |
| EXAMPLE 42 | Water | NMP | $LiCo_{0.98}Mg_{0.02}O_2$ | 4.9 ($\Delta$0.0) | 81% |
| COMPARATIVE EXAMPLE 2 | Water | — | $LiNi_{0.80}Co_{0.15}Al_{0.05}O_2$ | 5.3 ($\Delta$0.4) | 57% |
| COMPARATIVE EXAMPLE 5 | Water | — | $LiNi_{0.50}Co_{0.20}Mn_{0.30}O_2$ | 5.2 ($\Delta$0.3) | 65% |
| COMPARATIVE EXAMPLE 8 | Water | — | $LiNi_{1/3}Co_{1/3}Mn_{1/3}O_2$ | 5.1 ($\Delta$0.2) | 62% |
| COMPARATIVE EXAMPLE 11 | Water | — | $LiMn_2O_4$ | 5.2 ($\Delta$0.3) | 69% |
| COMPARATIVE EXAMPLE 14 | Water | — | $LiCoO_2$ | 5.2 ($\Delta$0.3) | 73% |
| COMPARATIVE EXAMPLE 17 | Water | — | $LiCo_{0.98}Mg_{0.02}O_2$ | 5.2 ($\Delta$0.3) | 70% |

TABLE 8

|  | Washing Solution | | | | | Composition of Lithium Composite Oxide | Physical Properties | |
|---|---|---|---|---|---|---|---|---|
|  | Water-Washing Step | 1st Washing Solution | 2nd Washing Solution | 3rd Washing Solution | 4th Washing Solution |  | Battery Thickness ((Amount of Change)/mm) | Capacity Retention Rate |
| EXAMPLE 43 | — | NMP + Water (20:80) | NMP + Water (50:50) | NMP + Water (80:20) | — | $LiNi_{0.80}Co_{0.15}Al_{0.05}O_2$ | 5.0 ($\Delta$0.1) | 80% |
| EXAMPLE 44 | — | NMP + Water (20:80) | NMP + Water (50:50) | NMP + Water (80:20) | NMP | $LiNi_{0.80}Co_{0.15}Al_{0.05}O_2$ | 4.9 ($\Delta$0.0) | 84% |
| EXAMPLE 45 | Water | NMP + Water (20:80) | NMP + Water (50:50) | NMP + Water (80:20) | — | $LiNi_{0.80}Co_{0.15}Al_{0.05}O_2$ | 4.9 ($\Delta$0.0) | 83% |

TABLE 8-continued

| | Washing Solution | | | | | | Physical Properties | |
| | | | | | | | Battery | |
| | Water-Washing Step | 1st Washing Solution | 2nd Washing Solution | 3rd Washing Solution | 4th Washing Solution | Composition of Lithium Composite Oxide | Thickness ((Amount of Change)/mm) | Capacity Retention Rate |
|---|---|---|---|---|---|---|---|---|
| EXAMPLE 46 | Water | NMP + Water (20:80) | NMP + Water (50:50) | NMP + Water (80:20) | NMP | $LiNi_{0.80}Co_{0.15}Al_{0.05}O_2$ | 4.9 (Δ0.0) | 86% |
| EXAMPLE 47* | Water → | NMP + Water (20:80) → | NMP + Water (50:50) → | NMP + Water (80:20) → | NMP | $LiNi_{0.80}Co_{0.15}Al_{0.05}O_2$ | 4.9 (Δ0.0) | 82% |
| EXAMPLE 48 | — | NMP + Water (80:20) | NMP + Water (50:50) | NMP + Water (20:80) | — | $LiNi_{0.80}Co_{0.15}Al_{0.05}O_2$ | 4.9 (Δ0.0) | 79% |
| EXAMPLE 49 | — | Ac + Water (20:80) | Ac + Water (50:50) | Ac + Water (80:20) | — | $LiNi_{0.80}Co_{0.15}Al_{0.05}O_2$ | 5.0 (Δ0.1) | 75% |
| EXAMPLE 50 | — | Ac + Water (20:80) | Ac + Water (50:50) | Ac + Water (80:20) | Ac | $LiNi_{0.80}Co_{0.15}Al_{0.05}O_2$ | 5.0 (Δ0.1) | 80% |
| COMPARATIVE EXAMPLE 1 | — | — | — | — | — | $LiNi_{0.80}Co_{0.15}Al_{0.05}O_2$ | 5.7 (Δ0.8) | 55% |
| COMPARATIVE EXAMPLE 2 | Water | — | — | — | — | $LiNi_{0.80}Co_{0.15}Al_{0.05}O_2$ | 5.3 (Δ0.4) | 57% |

*EXAMPLES 46 and 47 differ in the process after the water-washing step and the process after the washing step using each washing solution.

In the results of the cycle test, a significant difference was observed in cycle characteristics between the non-aqueous secondary batteries obtained in EXAMPLES 1 to 50 and the non-aqueous secondary batteries obtained in COMPARATIVE EXAMPLES 1 to 18. Specifically, each of the non-aqueous secondary batteries obtained in EXAMPLES 1 to 50 showed a small increase in battery thickness after the cycle test, and a good capacity retention rate, because a water-soluble polar aprotic solvent was used as a washing solution for washing a lithium-containing composite oxide.

In EXAMPLE 1, the lithium-containing composite oxide powder was analyzed by X-ray diffractometry before and after washing with NMP, and it was found that diffraction peaks attributed to lithium hydroxide and lithium carbonate contained in the lithium-containing composite oxide before washing were not detected after washing. It was also found from comparison with COMPARATIVE EXAMPLES 1 to 3 that EXAMPLE 1 clearly exhibited an effect of suppressing battery thickness increase and an effect of improving cycle characteristics.

It was also found that the water-soluble polar aprotic solvents used in EXAMPLES 2 to 13 can remove lithium hydroxide and lithium carbonate and suppress gas generation in the battery.

In EXAMPLE 14, after washing with NMP, the solvent was removed until the solids content was 95%, a positive electrode material mixture paste was produced without further removing the solvent, and a battery was produced using the positive electrode material mixture paste. In this case as well, the effect of reducing the amount of gas generated was obtained as in EXAMPLE 1 in which the solvent was further removed by drying. That is, it was found that it is possible to suppress the regeneration of lithium hydroxide and lithium carbonate even when the solvent is not removed completely.

From EXAMPLES 15 to 29, it was found that the action and effect obtained in EXAMPLES 1 to 13 is also obtained when various lithium-containing composite oxides are used.

From a comparison between EXAMPLE 30 and COMPARATIVE EXAMPLE 2, a comparison between EXAMPLE 32 and COMPARATIVE EXAMPLE 5, a comparison between EXAMPLE 33 and COMPARATIVE EXAMPLE 8, a comparison between EXAMPLE 34 and COMPARATIVE EXAMPLE 11, a comparison between EXAMPLE 35 and COMPARATIVE EXAMPLE 14, and a comparison between EXAMPLE 36 and COMPARATIVE EXAMPLE 17, it was found that the amount of gas generated during cycle testing is smaller in the examples in which the lithium-containing composite oxide was washed with a water-soluble polar aprotic solvent than in the comparative examples in which the lithium-containing composite oxide was washed with only water.

It was found from EXAMPLES 37 to 50 that it is possible to suppress the amount of residual water in the active material surface in the drying step, as well as the regeneration of lithium hydroxide by proton exchange, by reducing the concentration of water in the washing solution as the number of repetitions of the washing step increases.

When washing was performed with a mixed solution containing 20 parts by weight of water and 80 parts by weight of NMP as in EXAMPLES 30, 32 and 33, the amount of residual water in the active material surface was smaller than when washing was performed only with water as in COMPARATIVE EXAMPLES 2, 5 and 8, from which it was found that the regeneration of lithium hydroxide can be suppressed.

It was also found that the regeneration of lithium hydroxide can be suppressed and the effect of reducing the amount of gas generated can be obtained even when a solvent mixture of water and a solvent other than NMP is used as in EXAMPLE 31.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A method for producing a lithium-containing composite oxide represented by General Formula (1):

$$Li_xM_yMe_{1-y}O_{2+\delta} \qquad (1)$$

where M represents at least one element selected from the group consisting of Ni, Co and Mn, Me represents a metal element that is different from M, δ represents a deficit or excess of oxygen, $-0.1 \leq \delta \leq 0.1$, $0.95 \leq x \leq 1.10$ and $0.1 \leq y \leq 1$, the method comprising the steps of:

baking a lithium compound and a compound that contains M and Me to obtain a baked product; and washing said baked product with a washing solution that contains one or more water-soluble polar aprotic solvents selected from the group consisting of water-soluble polar aprotic solvents represented by the following General Formulas (2) to (8):

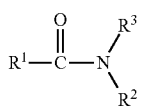 (2)

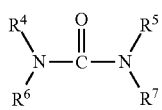 (3)

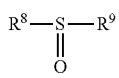 (4)

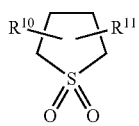 (5)

$R^{12}-C\equiv N$ (6)

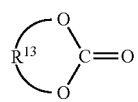 (7)

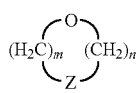 (8)

where $R^1$ and $R^2$ each independently represent a hydrogen atom or an alkyl group having 1 to 3 carbon atoms, or $R^1$ and $R^2$ are bonded to each other and represent an alkylene group having 3 to 6 carbon atoms that forms a ring with a nitrogen atom; $R^3$ represents an alkyl group having 1 to 3 carbon atoms or a cycloalkyl group having 4 to 7 carbon atoms; $R^4$ and $R^5$ each independently represent a methyl group or an ethyl group; $R^6$ and $R^7$ each independently represent a methyl group or an ethyl group, or $R^6$ and $R^7$ are bonded to each other and represent an alkylene group having 2 to 4 carbon atoms that forms a ring with two nitrogen atoms and a carbonyl carbon; $R^8$ and $R^9$ each independently represent a methyl group or an ethyl group, or $R^8$ and $R^9$ are bonded to each other and represent an alkylene group having 4 to 6 carbon atoms that forms a ring with a sulfur element; $R^{10}$ and $R^{11}$ each independently represent a hydrogen atom, a methyl group or an ethyl group; $R^{12}$ represents an alkyl group having 1 to 3 carbon atoms; $R^{13}$ represents an alkylene group having 2 to 4 carbon atoms; Z represents an oxygen atom or a methylene group, and m and n each independently represent an integer from 1 to 3.

2. The method for producing a lithium-containing composite oxide in accordance with claim 1, wherein said washing solution comprises only a water-soluble polar aprotic solvent selected from said group.

3. The method for producing a lithium-containing composite oxide in accordance with claim 1, wherein said washing solution is a solvent mixture of water and a water-soluble polar aprotic solvent selected from said group.

4. The method for producing a lithium-containing composite oxide in accordance with claim 1, wherein said water-soluble polar aprotic solvent is N-methyl-2-pyrrolidone, N-methyl formamide, N-methyl acetamide, N-methyl propionamide, N,N-dimethyl formamide, N-cyclohexyl pyrrolidone, N,N'-dimethylimidazolidinone, N,N'-dimethyl propylene urea, dimethylsulfoxide, sulfolane, acetonitrile, propylene carbonate or dioxane.

5. The method for producing a lithium-containing composite oxide in accordance with claim 1, further comprising a water-washing step of washing said baked product with water before said washing step.

6. The method for producing a lithium-containing composite oxide in accordance with claim 1, wherein said compound that contains elements represented by M and Me is a compound containing nickel.

7. The method for producing a lithium-containing composite oxide in accordance with claim 6, wherein said compound containing nickel is an oxide or hydroxide containing nickel.

8. The method for producing a lithium-containing composite oxide in accordance with claim 6, wherein said lithium compound is lithium hydroxide or lithium carbonate.

9. The method for producing a lithium-containing composite oxide in accordance with claim 1, wherein when said washing step is repeated a plurality of times, where a number of repetitions of said washing step is defined as n, where n is an integer equal to or greater than 2, said washing step comprises:
a first washing step of washing said baked product obtained in said baking step with a first washing solution that comprises a solvent mixture of water and a water-soluble polar aprotic solvent selected from said group; and an nth washing step of washing said baked product that has been washed in an (n−1)th washing step with an nth washing solution that comprises a solvent mixture of water and a water-soluble polar aprotic solvent selected from said group or that comprises only a water-soluble polar aprotic solvent selected from said group, and the water-soluble polar aprotic solvent content of said nth washing solution is higher than the water-soluble polar aprotic solvent content of an (n−1)th washing solution.

10. A method for producing a lithium-containing composite oxide represented by General Formula (1):

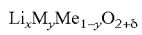 (1)

where M represents at least one element selected from the group consisting of Ni, Co and Mn, Me represents a metal element that is different from M, δ represents a deficit or excess of oxygen, $-0.1\leq\delta\leq0.1$, $0.95\leq x\leq1.10$ and $0.1\leq y\leq1$, the method comprising the steps of:

baking a lithium compound and a compound that contains M and Me to obtain a baked product; and washing said baked product with a washing solution that contains a water-soluble polar aprotic solvent, wherein when said washing step comprises a plurality of washing steps, where a number of repetitions of said washing step is defined as n, where n is an integer equal to or greater than 2, said washing step comprises:
a first washing step of washing said baked product obtained in said baking step with a first washing solution that comprises a solvent mixture of water and a water-soluble polar aprotic solvent; and an nth washing step of washing said baked product that has been washed in an (n−1)th washing step with an nth washing solution that comprises a solvent mixture of water and a water-soluble polar aprotic solvent or that comprises only a water-soluble polar aprotic solvent, and the water-soluble polar aprotic solvent content of said nth washing solution is higher than the water-soluble polar aprotic solvent content of an (n−1)th washing solution.

11. A non-aqueous secondary battery comprising a positive electrode that contains a positive electrode active material, a negative electrode that contains a negative electrode active material, a separator that is interposed between said positive electrode and said negative electrode, and a non-aqueous electrolyte, wherein said positive electrode active material contains a lithium-containing composite oxide produced by the method for producing a lithium-containing composite oxide in accordance with claim 1.

* * * * *